United States Patent
Gelardi et al.

[19]

[11] Patent Number: 6,059,102
[45] Date of Patent: *May 9, 2000

[54] CD HOLDER

[75] Inventors: Paul J. Gelardi, P.O. Box 127, Kennebunkport, Me. 04014; David A. Capotosto, Kennebunk; James R. Dussault, Kennebunkport, both of Me.

[73] Assignee: Paul J. Gelardi, Kennebunkport, Me.

[*] Notice: Under 35 U.S.C. 154(b), the term of this patent shall be extended for 215 days.

[21] Appl. No.: 08/597,033

[22] Filed: Feb. 5, 1996

[51] Int. Cl.[7] .................................................. B65D 85/97
[52] U.S. Cl. ....................................... 206/308.2; 206/310
[58] Field of Search ....................... 206/308.1, 307–313, 206/472, 232, 474, 807, 365; 220/334, 324, 326; 229/125.37

[56] References Cited

U.S. PATENT DOCUMENTS

| | | |
|---|---|---|
| 3,825,112 | 7/1974 | Schumaker et al. . |
| 4,635,792 | 1/1987 | Yamada et al. . |
| 4,709,812 | 12/1987 | Kosterka . |
| 4,714,157 | 12/1987 | Morrone .................................. 206/309 |
| 4,714,161 | 12/1987 | Thorud .................................. 206/807 |
| 4,746,013 | 5/1988 | Suzuki et al. . |
| 4,750,618 | 6/1988 | Schubert . |
| 4,793,479 | 12/1988 | Otsuka et al. . |
| 4,805,769 | 2/1989 | Soltis et al. . |
| 4,867,306 | 9/1989 | Factor . |
| 4,901,856 | 2/1990 | Thiele .................................... 206/493 |
| 4,903,829 | 2/1990 | Clemens . |
| 5,048,680 | 9/1991 | Fitzpatrick . |
| 5,052,564 | 10/1991 | Zuzack . |
| 5,101,971 | 4/1992 | Grobecker . |
| 5,188,230 | 2/1993 | O'Brien et al. . |
| 5,205,405 | 4/1993 | O'Brien et al. . |
| 5,232,089 | 8/1993 | Kim . |
| 5,284,242 | 2/1994 | Roth et al. . |
| 5,366,074 | 11/1994 | O'Brien et al. . |
| 5,372,253 | 12/1994 | O'Brien et al. . |
| 5,400,902 | 3/1995 | Kaminski . |
| 5,402,882 | 4/1995 | Bandy et al. . |
| 5,417,324 | 5/1995 | Joyce et al. . |
| 5,425,448 | 6/1995 | O'Brien et al. . |
| 5,450,951 | 9/1995 | Luckow . |
| 5,450,953 | 9/1995 | Reisman . |
| 5,456,368 | 10/1995 | Zehnder . |
| 5,477,960 | 12/1995 | Chen . |
| 5,566,828 | 10/1996 | Claes et el. .............................. 206/365 |
| 5,609,249 | 3/1997 | Cheng .................................. 206/308.1 |

FOREIGN PATENT DOCUMENTS

| | | |
|---|---|---|
| 2620258 | 3/1989 | France . |
| 2266514 | 11/1993 | United Kingdom . |
| 88/06559 | 3/1988 | WIPO .............................. 206/308.1 |
| WO 8907318 | 8/1989 | WIPO . |

*Primary Examiner*—Paul T. Sewell
*Assistant Examiner*—Luan K. Bui
*Attorney, Agent, or Firm*—James Creighton Wray; Meera P. Narasimhan

[57] ABSTRACT

A new CD package has a cover attached to a tray by a single hinge at one end of the tray. That simplified manufacture and assembly makes the entire cover available for printing and graphics. The CD package is assembled with a single direction motion of a paper board cover toward a plastic tray. The entire cover surface is available for graphics, and the complete package lies flat on either side when fully or partially opened. A hook folded on one paper board flap engages a ledge in the receiver. A flap on one paper board cover is slit and glued or physically attached to a hinged extension on the tray. When the flap is formed on one end of the cover, the cover wraps around the tray. When the flap is formed in the middle of a cover, the CD package opens like a book. More than one connector flap may be provided for connecting the cover to multiple trays. The trays may be double-sided with a central opening in a central platform to receive snap-in and twist-in rosettes. A locking rosette has a central push button which pulls spaced petals inward to disengage teeth. Thin areas whiten on pushing to indicate tampering. The rosettes connect to plastic or cardboard trays. A snap in the cover engages a complementary opening in the tray to hold the cover closed.

14 Claims, 35 Drawing Sheets

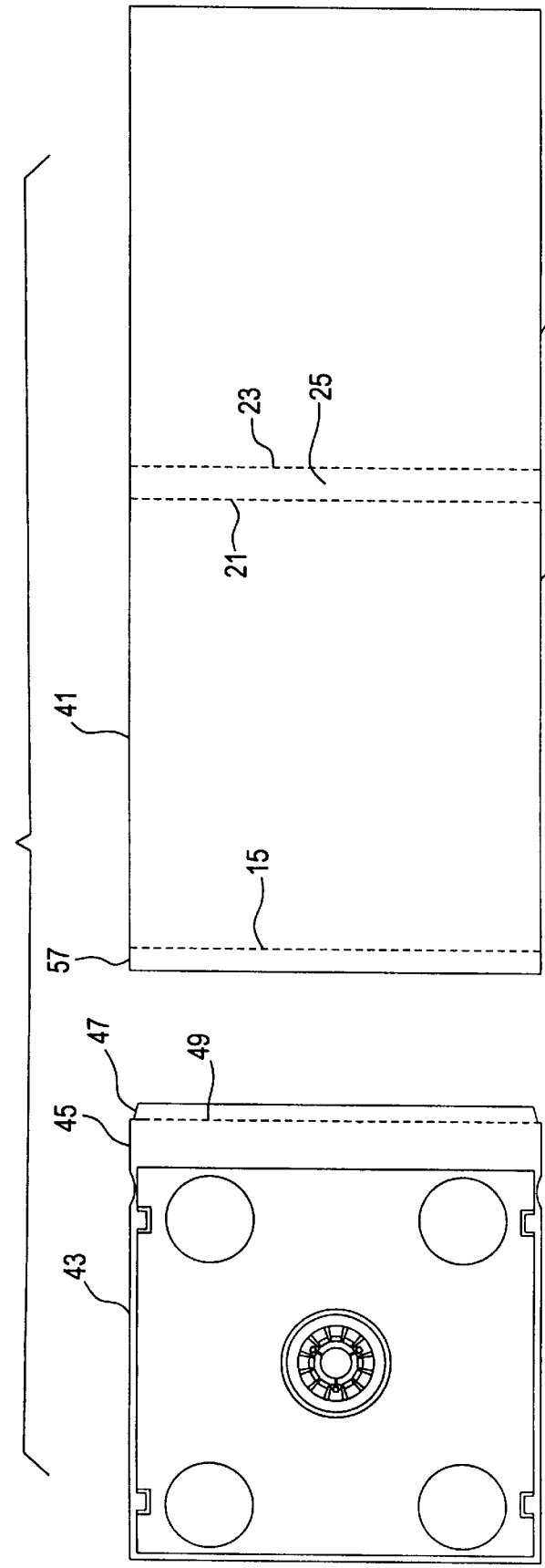
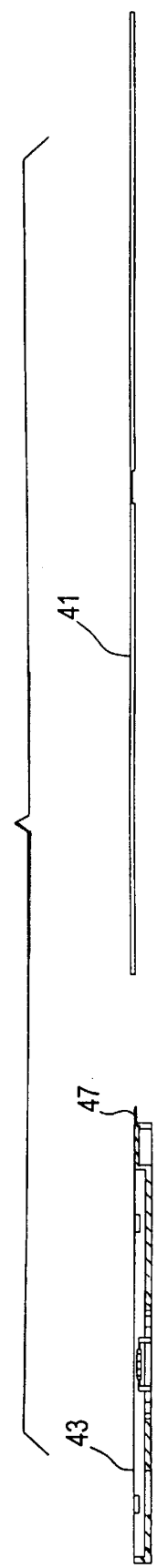
FIG. 9
FIG. 10

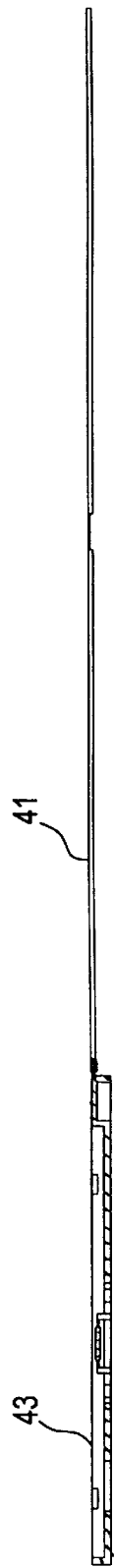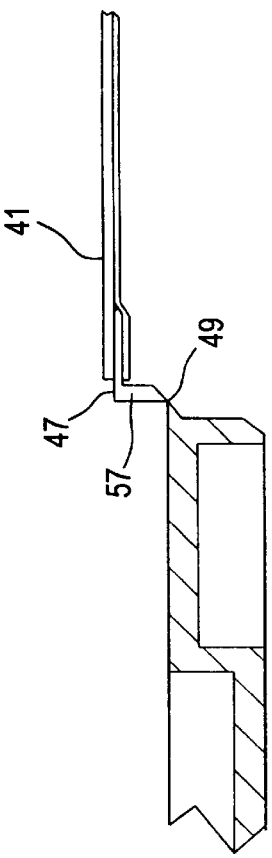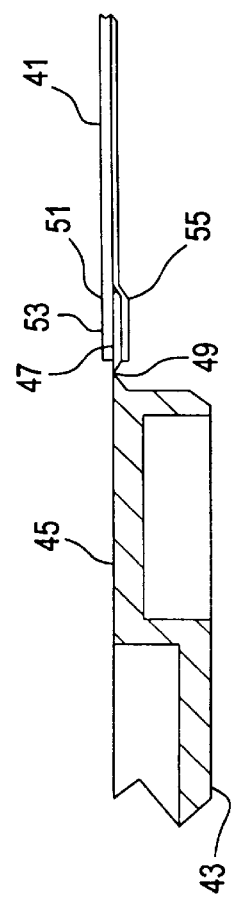
FIG. 11
FIG. 12A
FIG. 12B

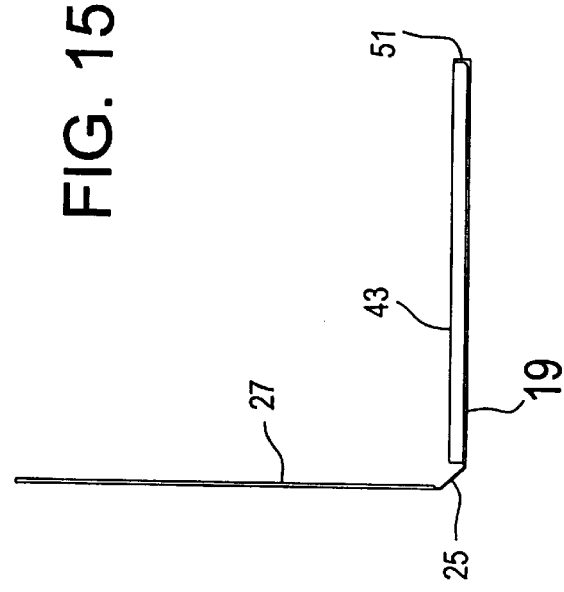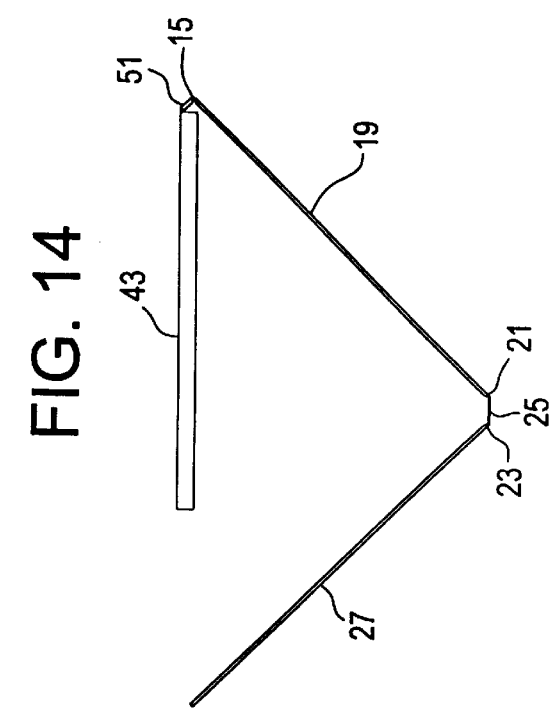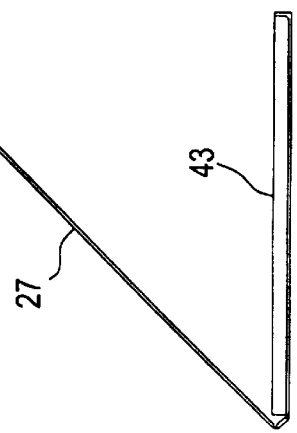
FIG. 13
FIG. 14
FIG. 15
FIG. 16
FIG. 17

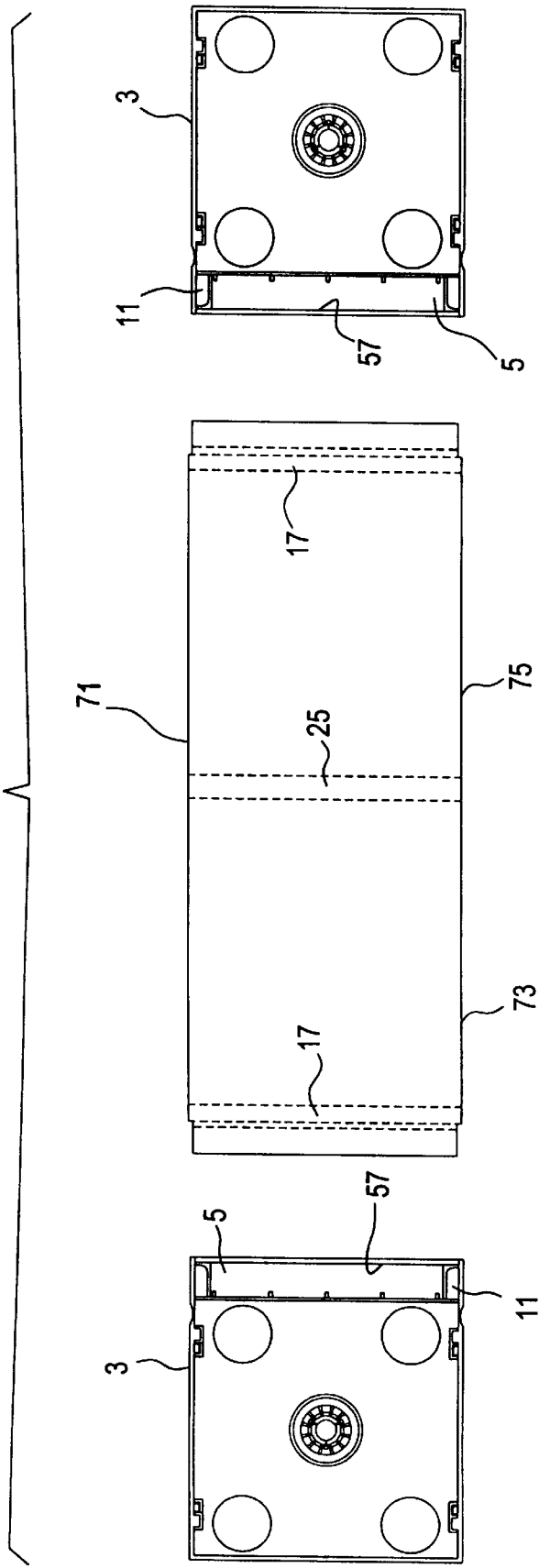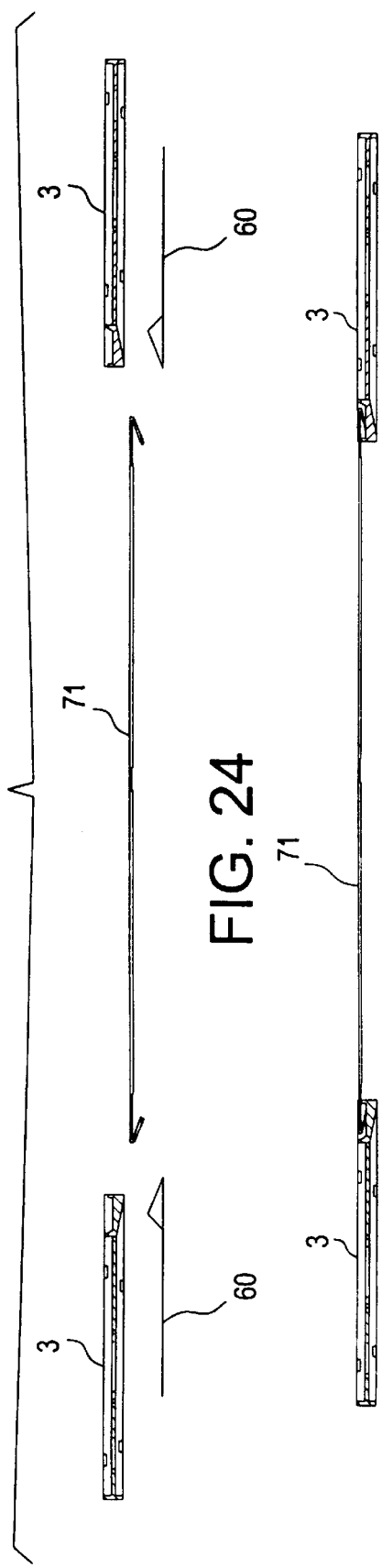

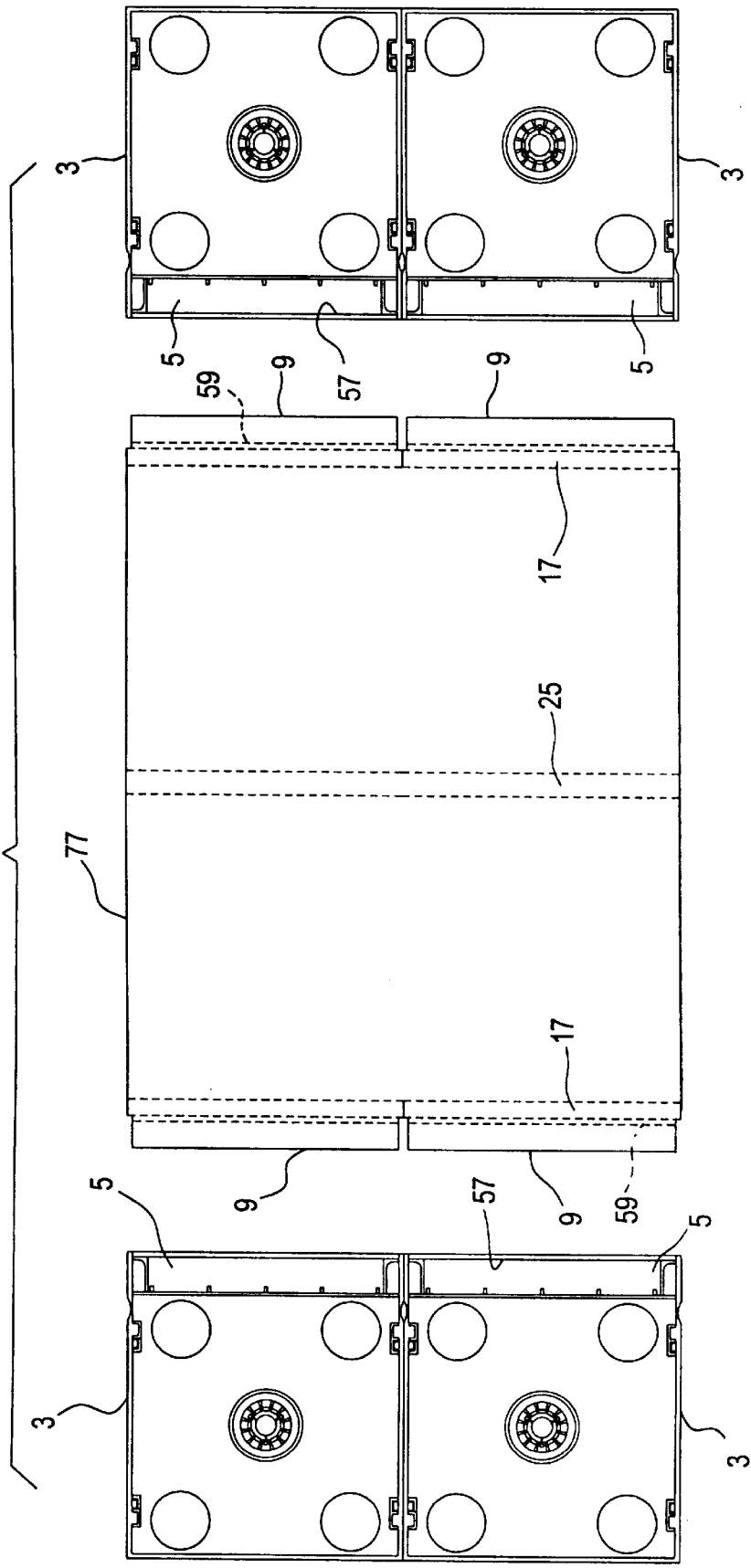

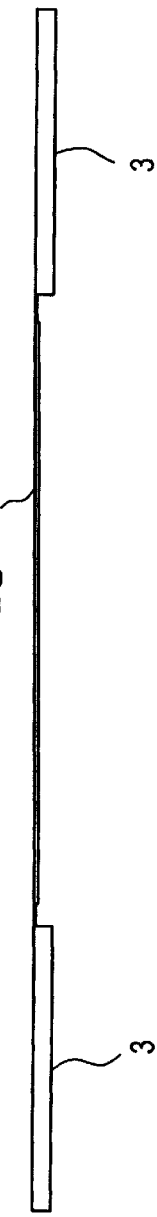
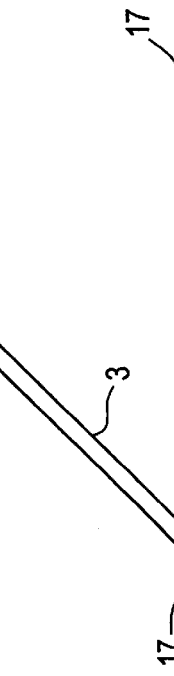
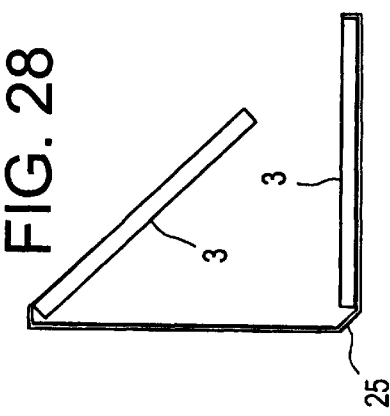
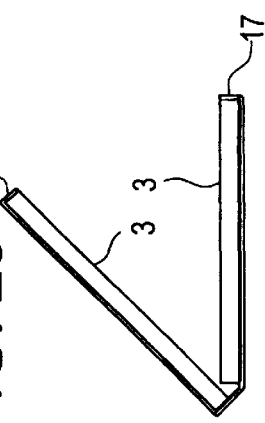

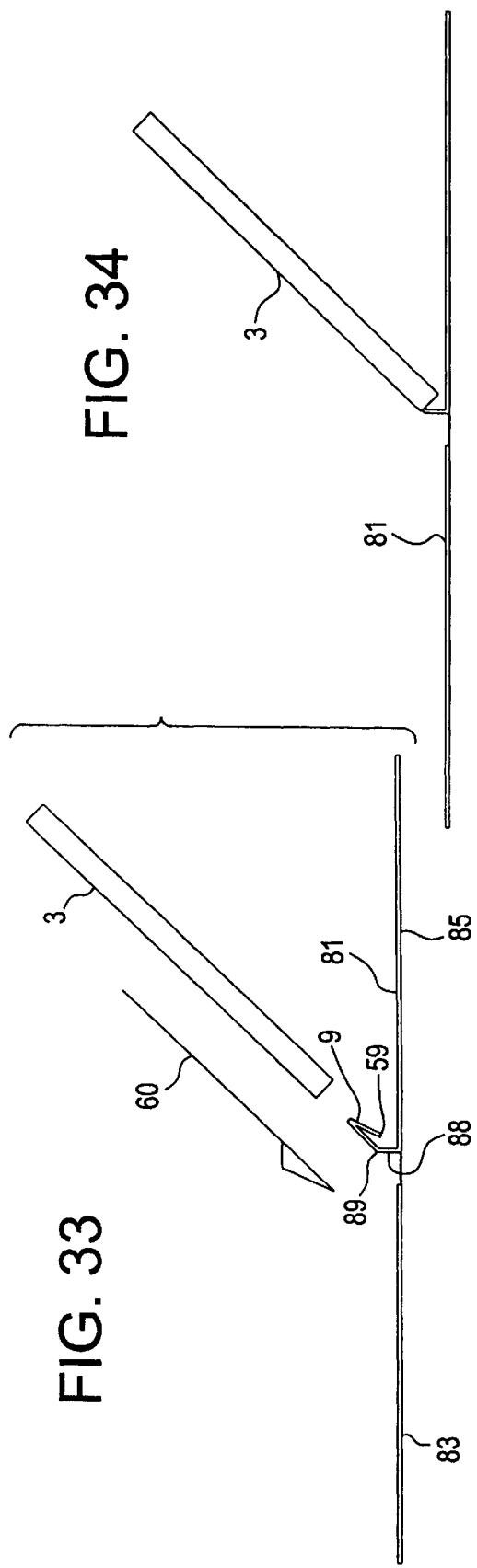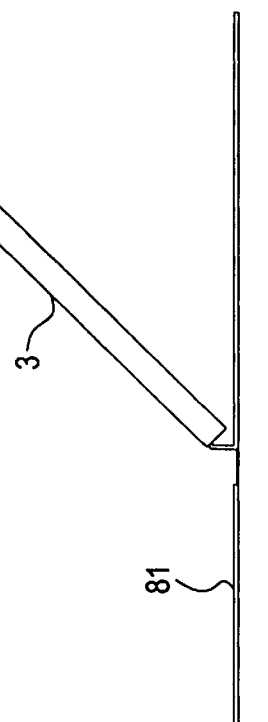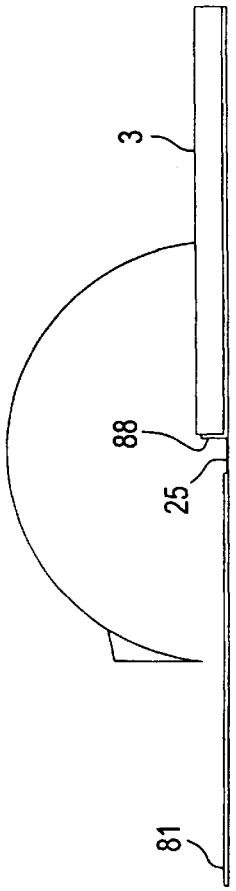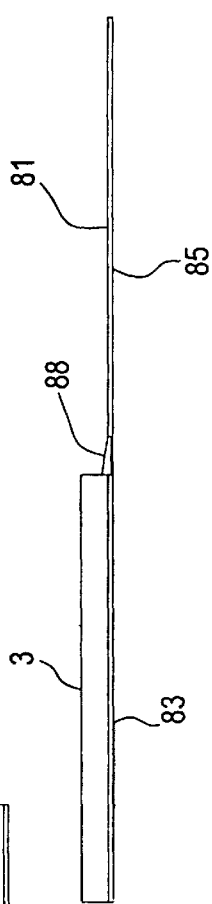

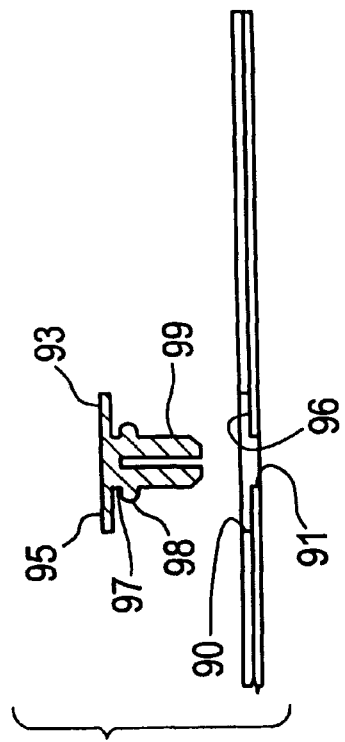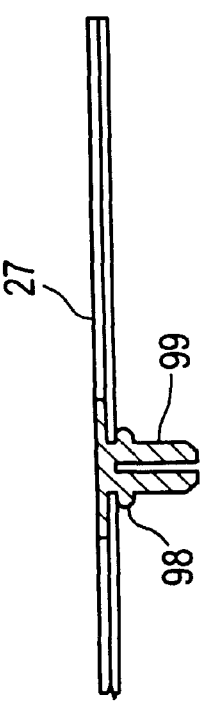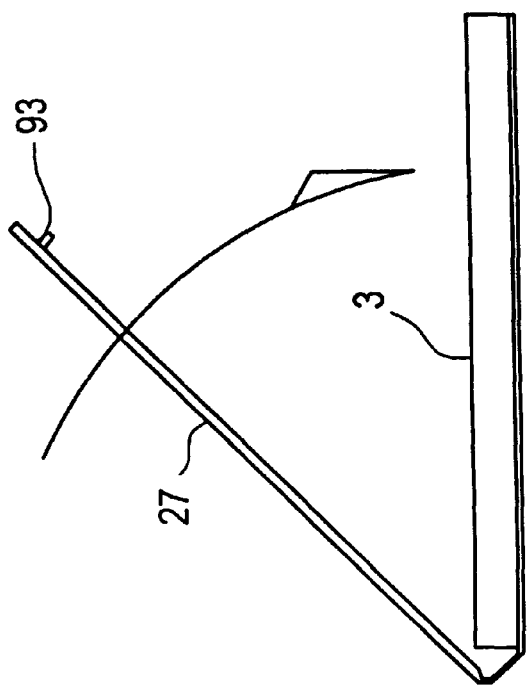

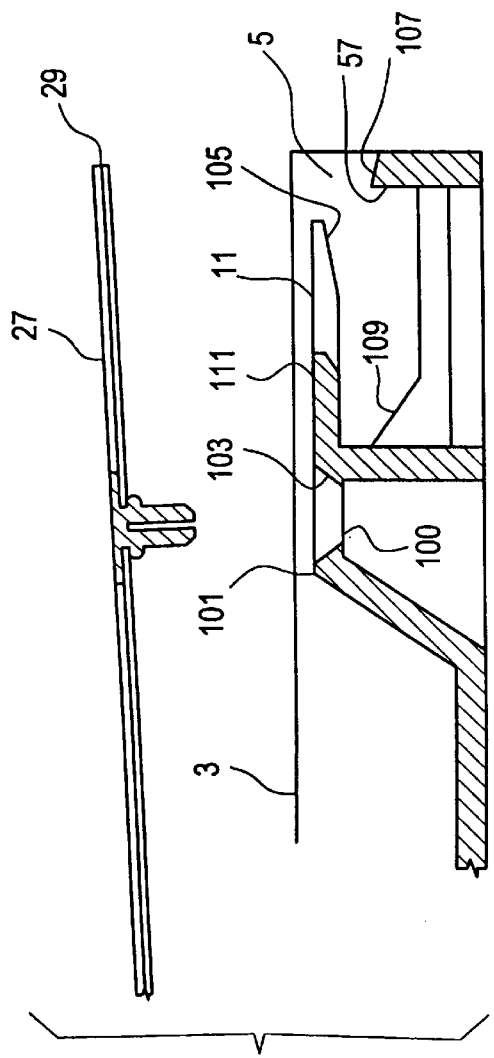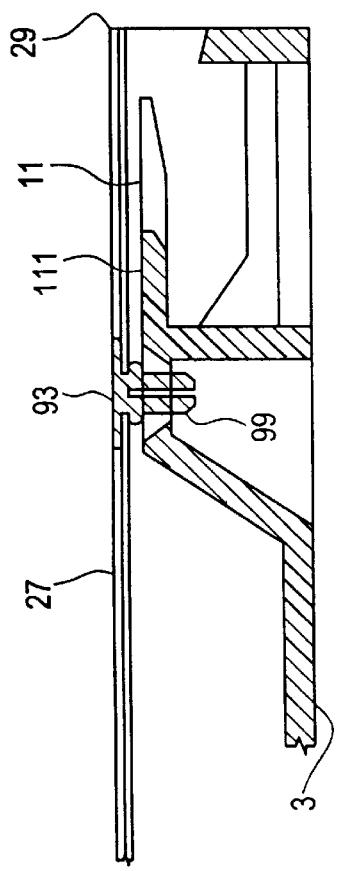

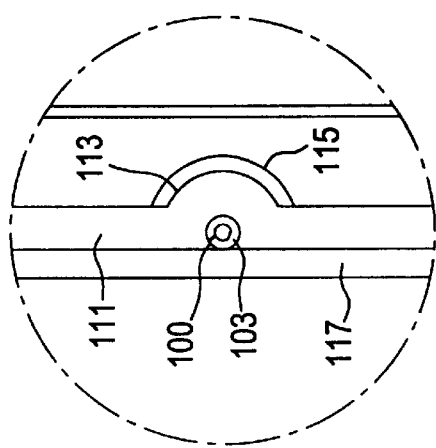

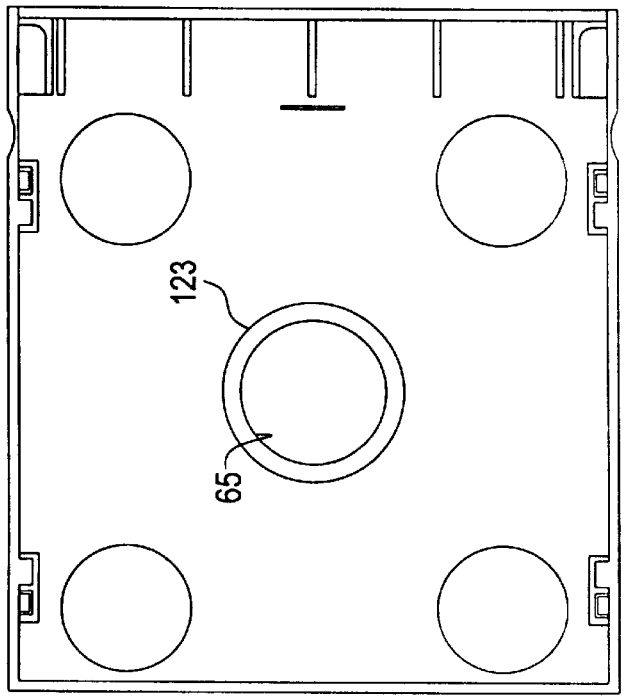
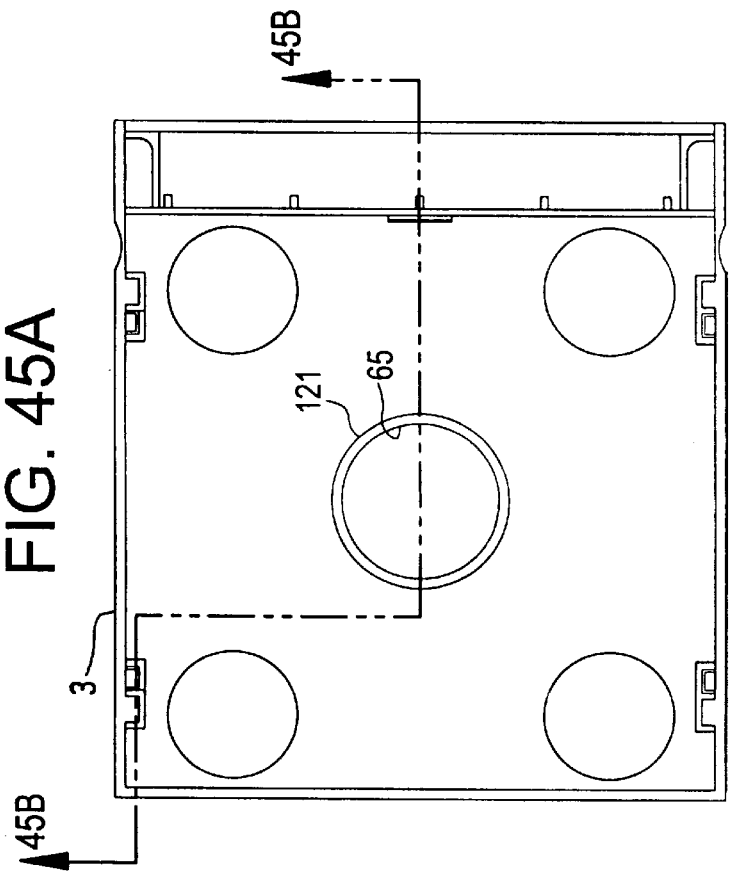
FIG. 45B
FIG. 45C
FIG. 45A

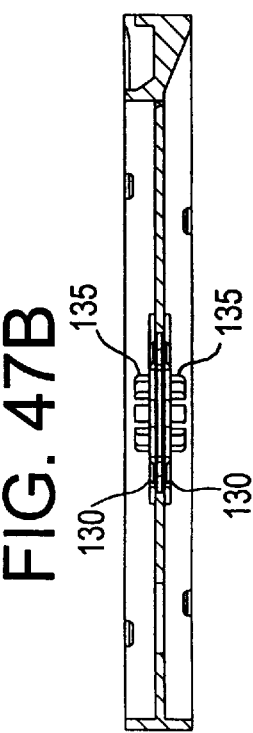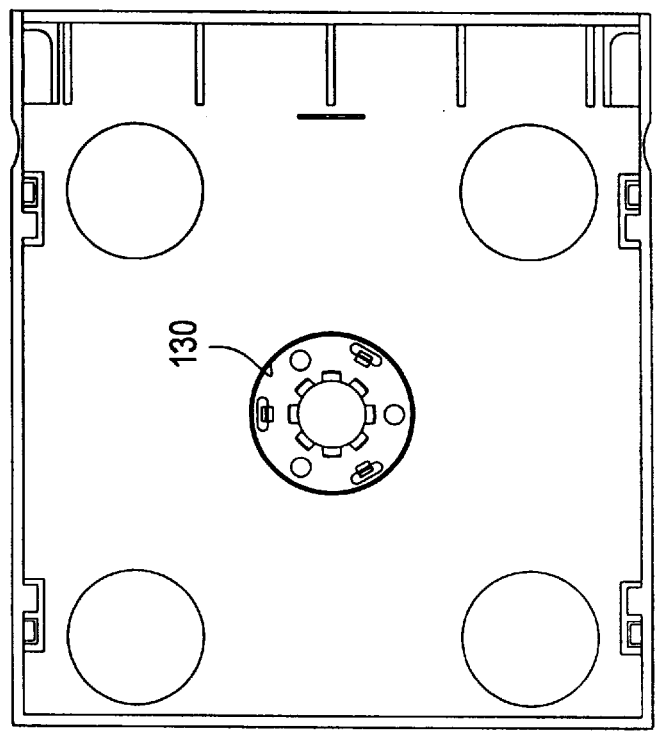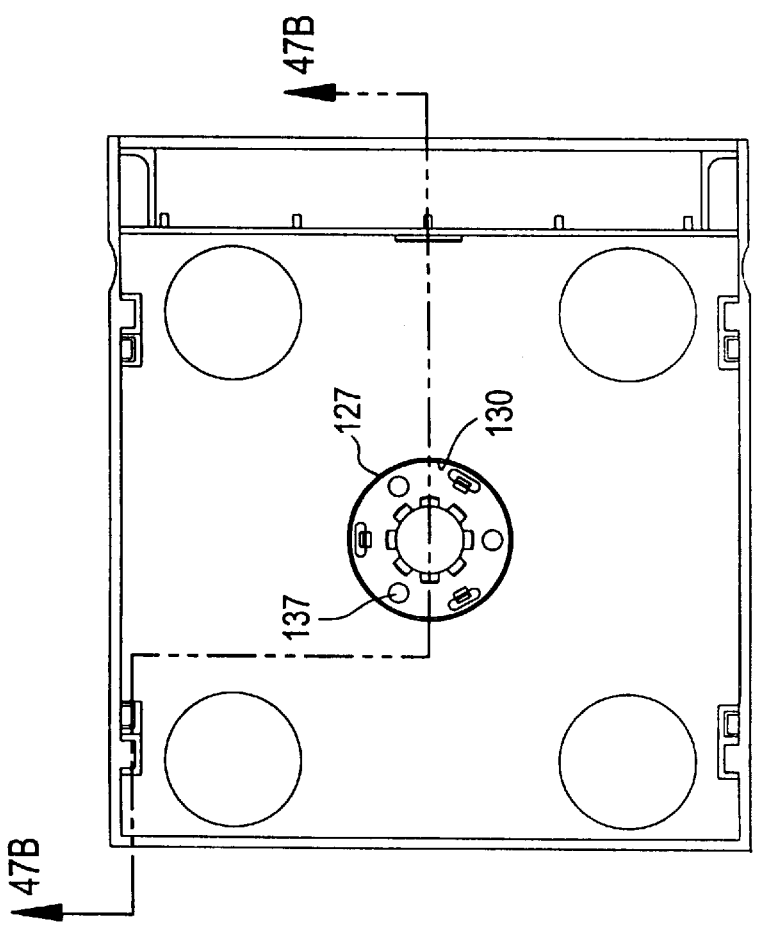

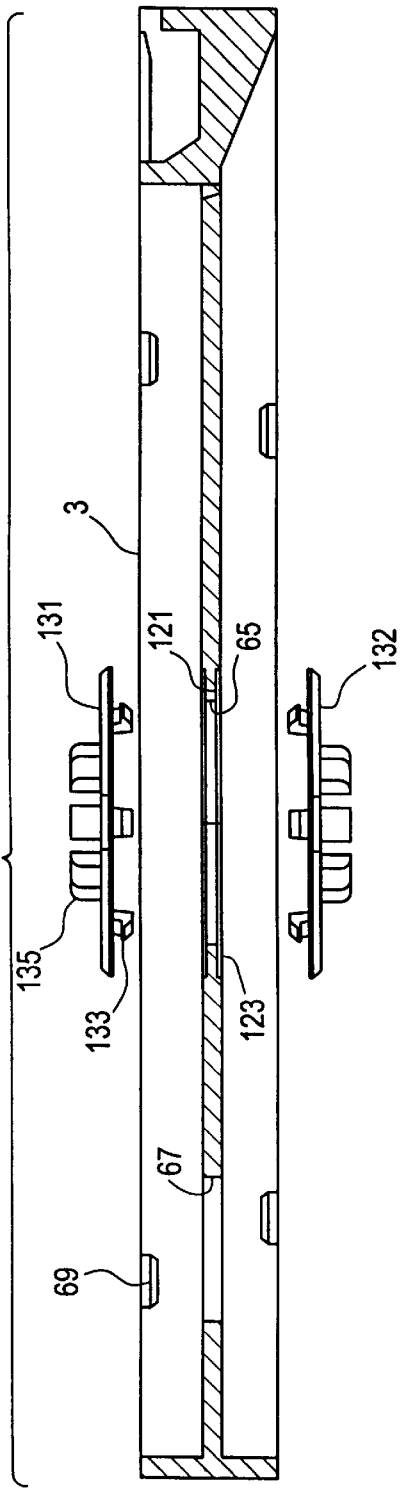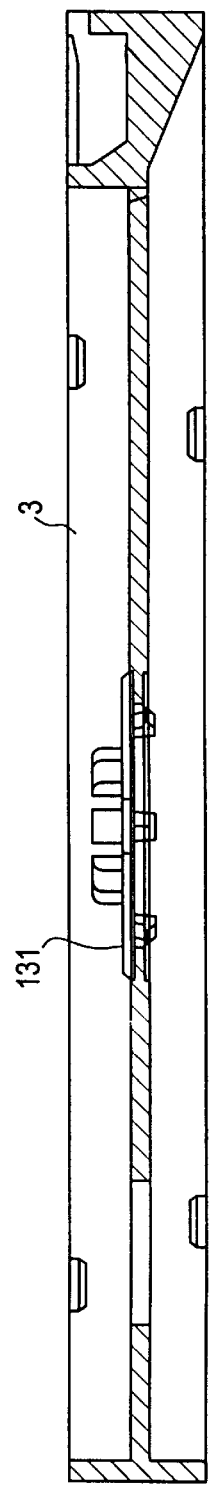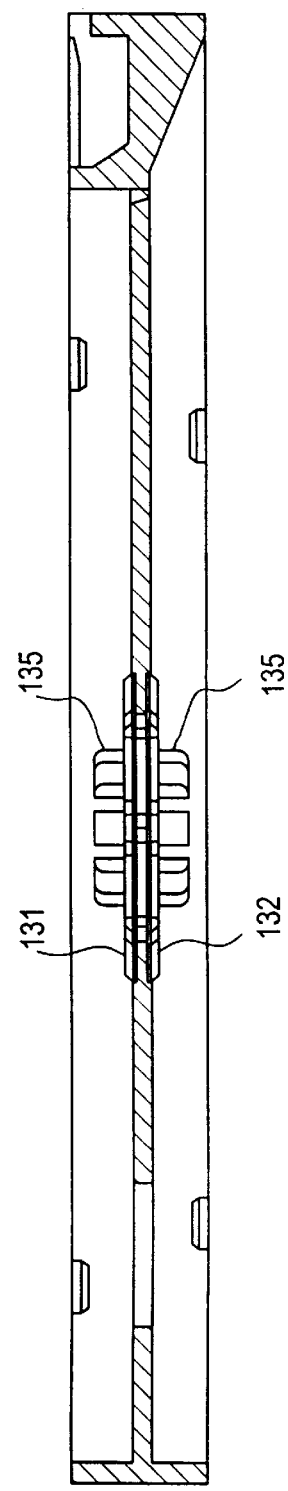

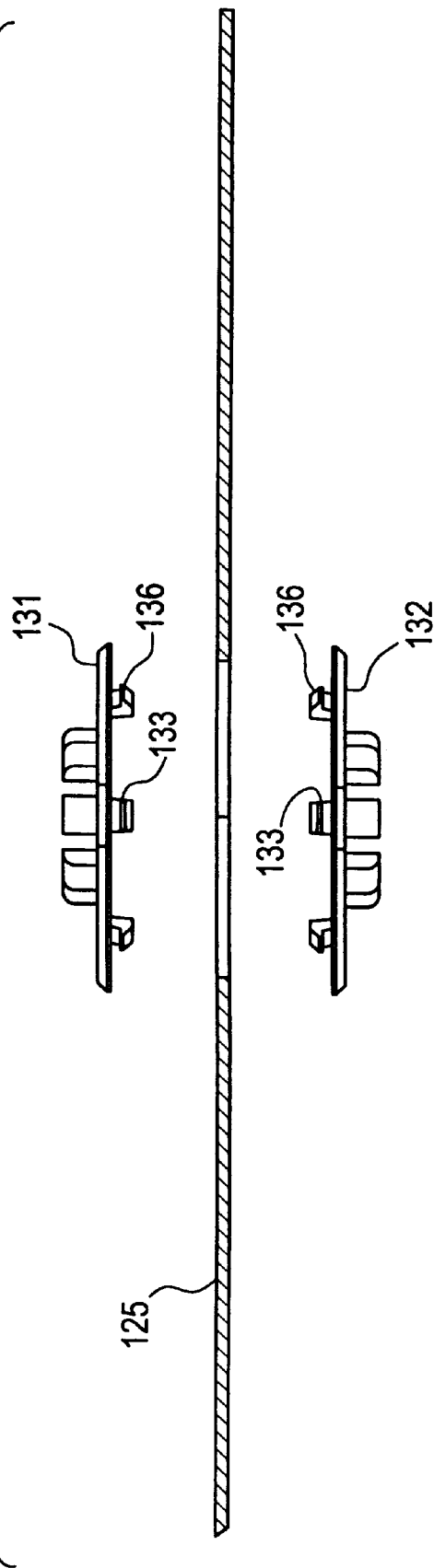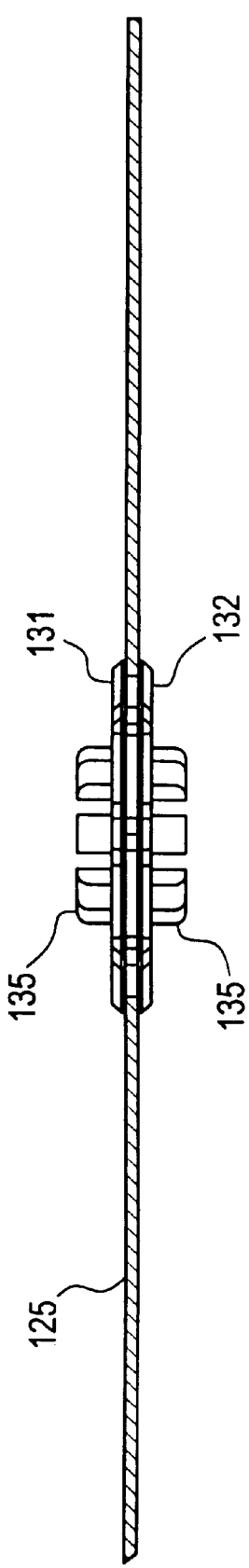

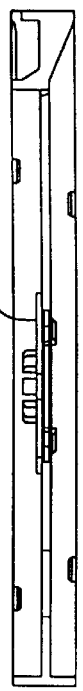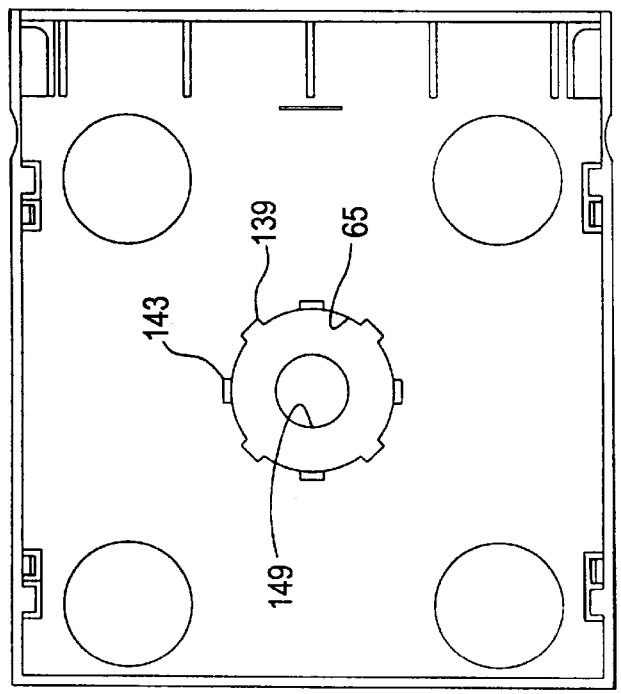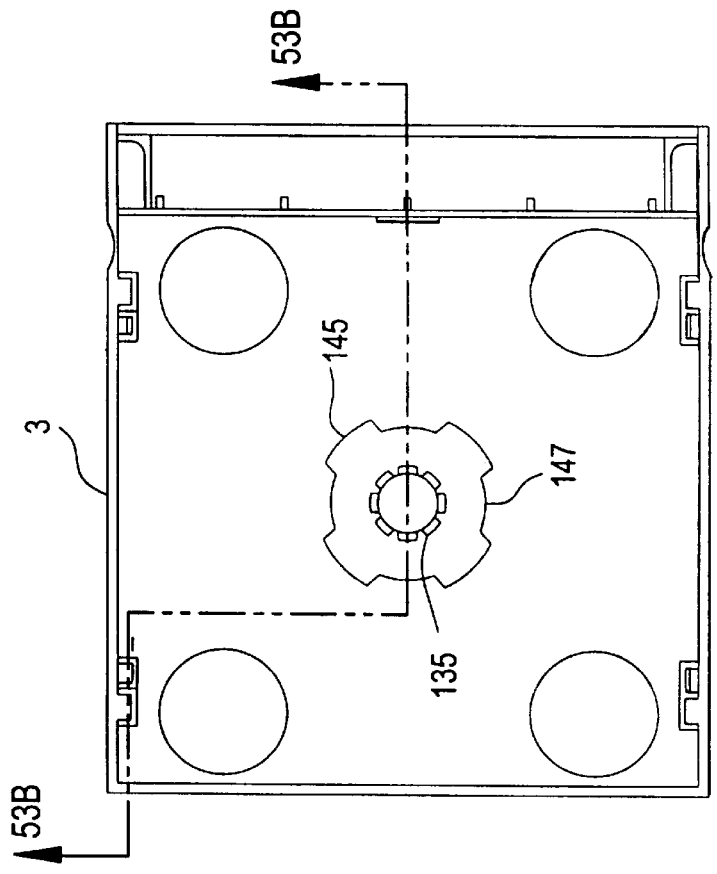

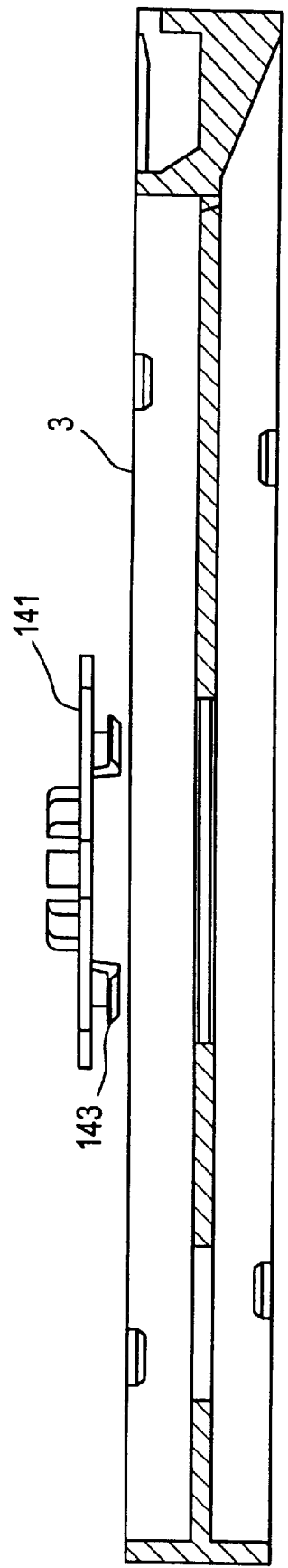
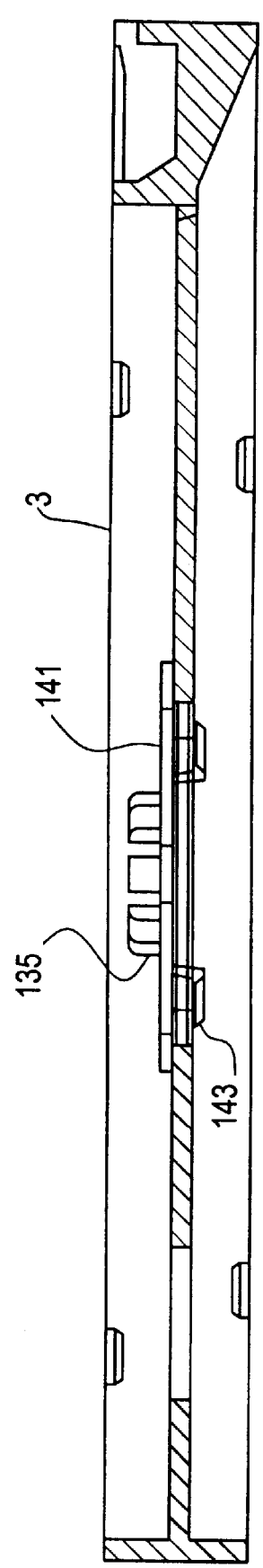

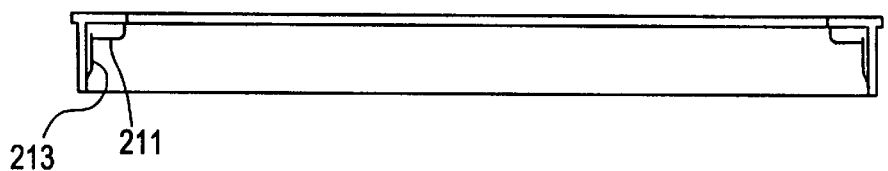
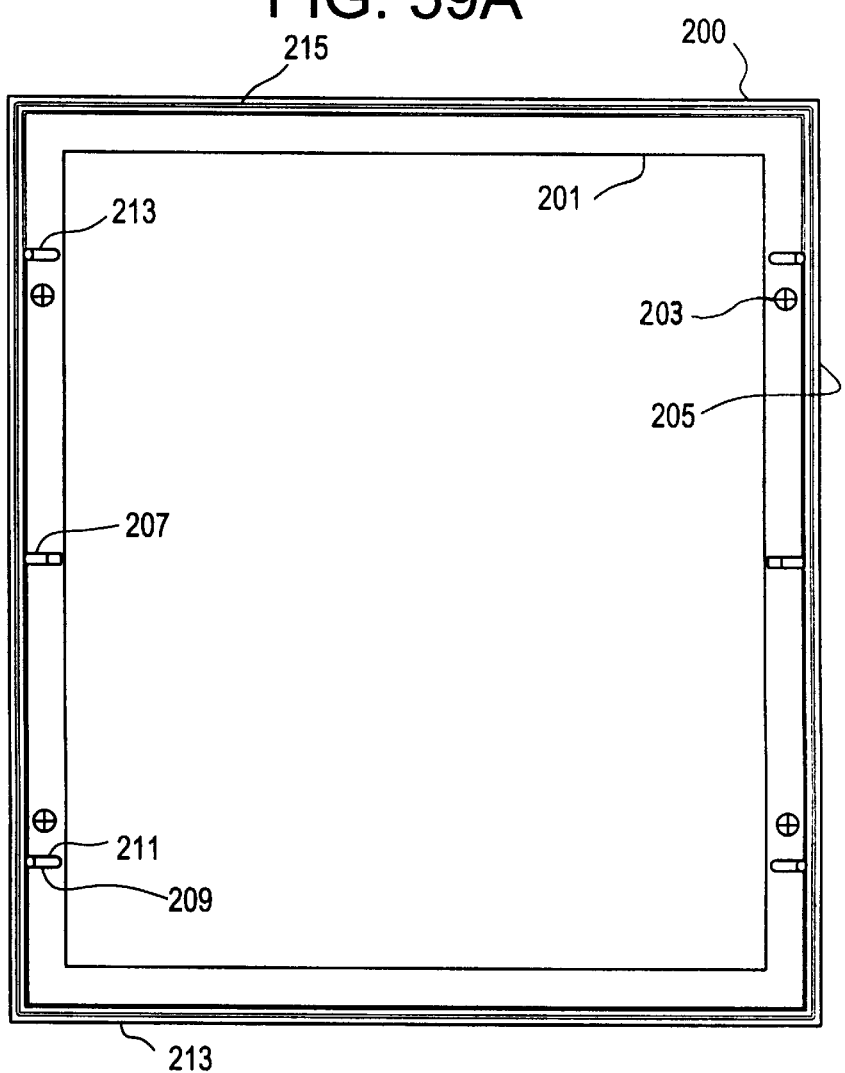
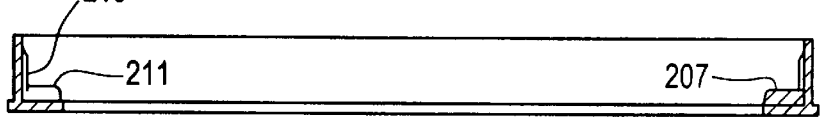

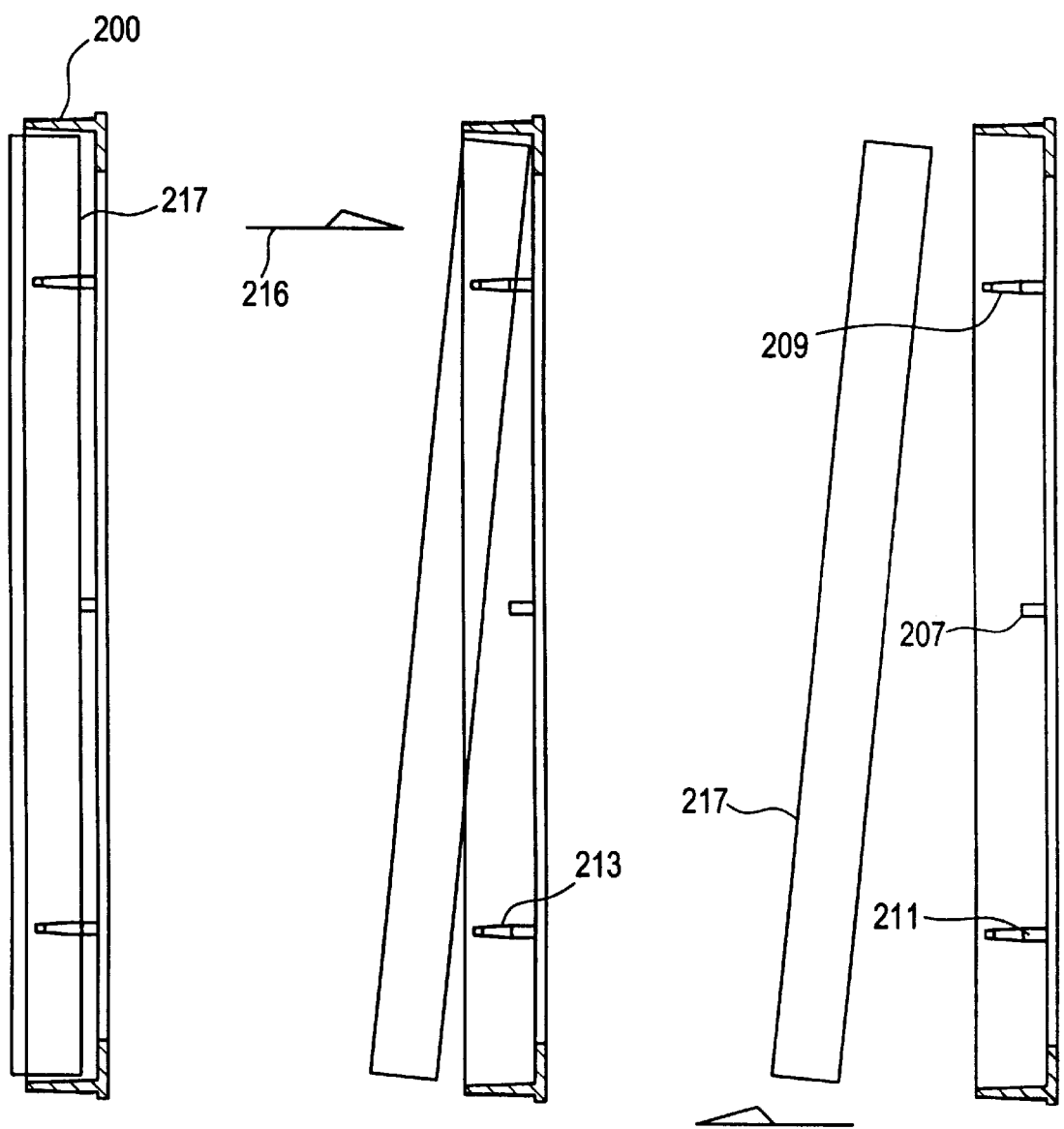

CD HOLDER

This invention involves new and improved CD packages, and packages for holding other media and objects.

SUMMARY OF THE INVENTION

The new CD pack is a unique composite plastic/cardboard package for storing CD's where the tray is attached to the package cover by a hinge at the edge of a tray.

A new latch closure uses a plastic latch which can be inserted into a package cover to allow the cover to latch onto a plastic tray to keep the cover closed.

New dual CD snap-in and twist-lock rosettes allow a tray to hold one or two discs. New locking rosettes lock a CD onto a tray until a release button is pushed.

The invention provides a CD wall mount which is a frame for mounting and holding a CD Jewel Box and dispensing it when desired.

The invention provides a CD pack which includes one or more plastic or paper board trays which attach to a cover via a member hinging from an edge of the tray. The hinged member may be a part of the tray or of the cover. The hinged member may be straight or L-shaped plastic extensions which hinge from an edge of the tray by living hinges or pivots and to which the covers are attached.

A preferred embodiment uses an extension of the cover which attaches to an edge of the tray. The attachment could be glue but is, preferably, a snap-in physical attachment or entrapment. The cover extension could be in the form of a flap formed on the outside edges of the cover or from internal edges. The flaps use creases in the cover material to allow the surfaces to hinge. The cover material is cardboard, paper board, plastic films or a combination of materials. The cover may be constructed with multiple panels to allow the option of a number of folding surfaces.

A preferred attachment includes a number of panels and involves flaps with multiple creases to create a self snap-in structure. At least two remaining creases in the flap create a double hinge so that the cover is attached to an edge of the tray and so that the tray can open flat. Additional creases in the cover allow the cover to wrap around the tray.

Prior cardboard/plastic constructions involve mounting a full face of the tray to a cardboard face by glue or other means. The advantage of the flap attachment hinging from an edge is that the use of the flap attachment allows the tray to hinge away from the cover, maximizing the exposure of printed cover graphics and text. In addition, it allows for the cover and tray to lie flat on a table.

In additional to a wrap-around cover configuration, a book-style cover locates the attachment flap in an internal edge of the cover created by folding and gluing a cover panel with a freely extending (non-glued) attachment flap. The attachment flap has multiple creases to create a self snap-in structure. At least two remaining creases in the flap create a double hinge so that the cover is attached to an edge of the trail and so that the tray can open flat. The flap can also be connected to a hinged extension at the end of the tray.

This construction also has the advantages of easy assembly and simple disassembly for recycling.

A latch closure is added to the package by the insertion of a plastic latch into the cover which engages the tray as a press fit or snap-fit closure. The latch is glued to the cover, or inserted between the layers of a glued cover or is a "through the cover" snap-in latch. The latch can be added when requested by the customer.

Dual CD snap-in or twist-lock rosettes provide storage of one or two discs in a tray. The dual CD snap-in or twist-lock rosettes allow either a second rosette to be snap-fit to a tray with a compatible molded in-rosette or allow two dual CD snap-in rosettes to be snap-fit to a tray with no rosettes. This invention has the advantage of allowing the additional rosettes to be added as needed. The snap-in feature is also a much easier method of adding rosettes than welding or gluing rosettes.

Some CD trays use two-sided rosettes. The disadvantage of a two-sided rosette is that, when used for holding a single CD, the customer may think there were supposed to be two CD's in the package. Dual CD snap-in rosettes allow the second rosette to be added when and if needed, avoiding customer confusion.

During shipment, a CD can come loose from the rosette and rattle around in the package. That can cause damage to the disc. Even if not damaged, a package with a loose disc is less merchantable. Increasing the interference of the rosette can reduce the problem but also makes it difficult to remove the CD without distorting and bending the disc. The locking rosette uses a number of locking petals which lock the CD onto the tray during shipment until a release button is pushed. The release button retracts the locking petals so that the disc can be removed simply and safely. The locking petals are attached by thin notches in the plastic, which allow the petals to hinge and retract. The notches will be stressed during retraction and will not immediately, if ever, return to the locking position.

Since the notches will stress whiten when retracted, this feature also has the advantage of being tamper evident.

The cover art of compact discs is often attractive and many owners would like a method of displaying their favorite albums. Often CD owners also have special storage for their favorite, or for frequently played, CD's. The CD wall mount is a "dispensing frame" which holds CD's in their CD boxes and allows the frame to be mounted on a wall or displayed as an easel. The CD wall mount uses several pivot ribs and thin gripping ribs so that the CD box is easily inserted and stored and is dispensed when desired by pushing on either of its two opposite ends.

All the rosettes can be used either with plastic substrates or with cardboard substrates.

A new CD package has a cover attached to a tray by a single hinge at one end of the tray. That simplified manufacture and assembly makes the entire cover available for printing and graphics. The CD package is assembled with a single direction motion of a paper board cover toward a plastic tray. The entire cover surface is available for graphics, and the complete package lies flat on either side when fully or partially opened. A hook folded on one paper board flap engages a ledge in the receiver. A flap on one paper board cover is slit and glued or physically attached to a hinged extension on the tray. When the flap is formed on one end of the cover, the cover wraps around the tray. When the flap is formed in the middle of a cover, the CD package opens like a book. More than one connector flap may be provided for connecting the cover to multiple trays. The trays may be double-sided with a central opening in a central platform to receive snap-in and twist-in rosettes. A locking rosette has a central push button which pulls spaced petals inward to disengage teeth. Thin areas whiten on pushing to indicate tampering. The rosettes connect to plastic or cardboard trays. A snap in the cover engages a complementary opening in the tray to hold the cover closed. CD packages are stored in a wall mounted frame. The packages are spaced from a base and are gripped by thin projections along the inside of the walls. Pushing on one end of the package moves the other end of the package out of the wall mount.

A disc package includes a plastic tray having a base with a rosette for engaging a central hole of a disc. At one end, the tray has an outward opening receiver with a ledge along the opening. The package further includes a folded and creased paper board cover having a bottom panel, a top panel, an outer spine panel defined by creases between the bottom panel and the top panel, an end spine panel connected to the bottom panel and a folded hook extending outward from the end spine panel. The folded hook has a dimension for fitting through the opening in the receiver of the tray for assembling the cover on a tray with one single unidirectional motion. The hook also includes an edge for lying inside the receiver and against the ledge for preventing disengagement of the cover from the receiver, for providing a package with complete accessibility of all sides of the paper board cover for printing and for providing a package which lies flat when the cover is partially or fully open.

The receiver of the package further includes a flat intermediate surface extending across one end of the tray. The opening is positioned in the end of the tray above the flat intermediate surface, and the ledge extends upward from the flat intermediate surface at the end of the tray, partially closing the opening. The package further includes tabs positioned above a level of the intermediate surface and extending generally parallel to the surface for holding the hook downward on the surface with the edge of the hook engaging the ledge. The intermediate surface terminates laterally inward from the tabs so that the receiver and the tray may be made in a mold without side actions.

The base of the tray extends along a middle of the tray. Side walls and an end wall opposite the receiver extend perpendicularly to the base above and below the base. Cover supports extend inward from edges of the side walls for supporting the cover.

End spines are positioned on opposite ends of the cover and folded hooks extend from the end spines for engaging plural trays at opposite ends of the cover.

A disc package includes a plastic tray and paper board cover. The tray has a plastic extension on one end thereof coupled to a body of the tray by a living hinge. The cover has a flap connected to the plastic extension for connecting the cover to the tray and for folding with the plastic extension around one end of the tray when the cover is bent along creases to cover the tray.

The plastic extension is planar, and one end of the flap is slit for receiving the planar extension and anchoring the planar extension to the cover.

The extension is angular and has a first spine-forming portion connected to the tray by the living hinge, and has a second connecting portion extending at right angles to the spine-forming portion for connecting to the cover flap.

A disc package includes a plastic tray having a base for holding a rosette which is connectable to a disc. The tray has a receiver-connector at one end thereof, and a paper board cover having a bottom panel and a top panel and a spine panel between the bottom and top panels and creases defining the panels. Hooks extend from the flap for assembling in the receiver-connector with a single unidirectional motion, the hook engaging the receiver-connector for preventing withdrawal of the hook from the receiver-connector and holding the paper board cover and the plastic tray assembled, for permitting the plastic tray to fold flat against the bottom panel and flat against the top panel, for providing visual access to insides of both the bottom panel and the top panel and for providing access to upper and lower sides of the tray.

A disc package includes a plastic tray for holding a disc, a cover attached to the tray and a latch pin mounted in the cover remote from edges of the cover. The tray has an upward expanding opening at an upper portion thereof for receiving and guiding a latch pin and gripping the latch pin to hold the cover closed with the tray. The cover includes a paper board cover having a hole therein remote from edges of the cover and a latch pin inserted in the hole. The latch pin has a flat top for positioning in the hole and has a throat for extending through the hole and fastener prongs extending downward from the cover for connecting with the gripper opening in the tray. Raised knobs extend outward from the fastener prongs adjacent the cover for snapping the knobs in through the opening in the cover and preventing return through the opening. The cover is made of two-ply material. The upper ply has a relatively large opening for receiving the latch pin top, and the lower layer has a relatively small concentric opening for receiving the latch pin throat.

A disc package includes a tray having a base with a central opening for receiving a rosette for holding a disc and a rosette for connecting to the hole. The rosette has a generally disc-shaped base and disc-engaging rosette petals extending generally perpendicularly in one direction from the base. Spaced prongs extend from the rosette base generally perpendicularly in a direction opposite the rosette petals. The prongs extend through the central hole in the tray base for holding the rosette in the central hole and in the tray base. The central hole in the tray base has a recessed depression around the hole, and the rosette base has a periphery for fitting in the recessed depression of the tray base. The prongs have outward extending teeth for snapping into the central hole in the tray base and holding the rosette in the central hole. The rosette base has plural holes extending through the base, whereby a second rosette on an opposite side of the tray base may be snapped into the tray with the prongs of the rosettes extending through the holes in the opposite rosette bases and the teeth engaging the rosette holes for holding the prongs in the holes. The holes are extended in a circular direction and have radially enlarged portions thereof for receiving the prongs and teeth and twisting the rosettes into locking position. The prongs partially extend through the holes in the rosette base, and the teeth engage the central opening in the tray base in snap fit arrangement.

The central hole in the tray has regular radial extensions, the prongs fit through the central hole in the tray base and the teeth fit through the regular radial extensions for twisting and locking the rosette in the tray base. The rosette base has radial extensions extending beyond the prongs and teeth for covering the regular radial extensions of the central hole in the tray base when the rosette is locked in place.

The tray base is a flat sheet of material, such as a paper board.

A disc package includes a plastic tray, a rosette connected to the plastic tray with petals extending upward from the plastic tray for receiving and holding in a central opening in a disc, select spaced petals of the rosette having radially outward extending locking teeth for holding and locking a disc to the rosette prior to using the compact disc, connectors extending inward from the selected petals and a button centrally connecting the connectors. The selected petals are connected to the rosette by thin portions, for pushing on the button and pulling the connectors downward and inward, pulling the connectors and the selected petals downward and inward, and releasing the outward extending teeth from contact with the disc.

The connectors have thin portions for bending parts of the connectors with respect to the selected petals and the button. The thin portions whiten upon bending when pressing the button for withdrawing the teeth and releasing the compact disc, thereby indicating tampering.

A compact disc package includes a frame for receiving a Jewel Box. The frame has a flat generally rectangular open base, openings in the flat base for receiving fasteners to mount the base to a flat surface, walls extending upward from the base and supports mounted on the base along opposite walls and spaced from the walls perpendicular to the opposite walls for receiving a CD package within the walls and for spacing the CD package away from the base on the supports for removing the CD package by pressing on one end of the package and using the supports near that end as a fulcrum for moving an opposite end of the CD package out of the walls. Lateral grippers extend inward from the opposite walls near the support for gripping sides of the CD package.

A method of mounting a CD package on a flat surface includes the steps of mounting a flat base of a holder on the surface, pressing a CD package into the holder within enclosure walls of the holder, abutting the CD package on parallel supports spaced from the ends of the holder, holding the CD package in the holder with lateral inward projections from side walls, removing the CD package from the holder by pushing one end of the holder inward toward the base and driving the opposite end of the CD package from the holder, using a support as a fulcrum.

A method of assembling a CD package includes the steps of molding a CD tray in a mold without shutoffs, forming a base of the tray and side walls extending around the base and forming a receiver on one end of the base, forming a paper board cover by cutting, folding and gluing paper stock into a cover, creasing the cover to form top and bottom panels and a spine panel therebetween, and forming a connector flap on the cover and assembling the cover and tray with one unidirectional motion and securing the flap to the receiver.

The step of forming the receiver includes forming an opening with a ledge. The forming of the flap further includes forming a hook on the flap by folding the flap. The securing includes inserting the hook in the receiver opening and engaging an edge of the hook with a ledge in the receiver.

The step of forming the flap includes forming separated leaves at an end of the flap. The forming of the receiver includes forming a plastic extension on a living hinge at an end of the tray. The assembly step includes sliding the leaves on the extension and securing the leaves to the extension.

The forming of the flap includes forming the flap between one of the panels and the spine panel.

The method of assembling a CD package may further include the step of snapping a latch pin into the cover. The forming of the tray includes forming a latch pin receptor in an upper portion of the tray.

The step of forming the tray includes forming a central opening in the tray, forming a rosette having a base and rosette petals extending in one direction from the base and mounting prongs extending in another direction from the base, inserting the prongs through the central opening in the tray and connecting the rosette to the tray. The inserting of the prongs further includes snapping the prongs into the central opening in the tray. The inserting of the prongs further includes snapping the prongs into receiving openings in a base of an opposite rosette.

The step of inserting the prongs includes inserting the prongs in radial extensions of the central openings in the base of the tray and twisting the rosette for locking the prongs beneath the central opening.

The method of assembling a CD package further includes positioning the base of the rosette in a depression around the central opening in the base of the tray.

The method of assembling a CD package further includes the steps of providing a rosette in the compact disc tray, extending compact disc holder petals of the rosette in the tray, providing locking petals among the holder petals, providing a push button between the petals and connecting the locking petals to the push button, pressing downward on the button, and pulling the locking petals inwardly. The method further includes forming thin sections between the locking petals and a base of the rosette and forming thin sections in connectors between the locking petals and the button, permanently disfiguring and discoloring the thin sections upon pushing the button and inward pulling of the locking rosettes, thereby providing tamper indication.

These and further and other objects and features of the invention are apparent in the disclosure, which includes the above and ongoing written specification, with the claims and the drawings.

BRIEF DESCRIPTION OF THE DRAWINGS

FIG. 9 is a plan view of a cover and a plastic tray with a plastic extension on a living hinge for holding a flap of the cover.

FIG. 10 is a side elevation of the tray and cover shown in FIG. 9.

FIG. 11 is an assembled side elevation of the tray and cover shown in FIGS. 9 and 10.

FIG. 12A is a side elevational detail of the tray and cover attachment shown in FIG. 11.

FIG. 12B is an alternate side elevational detail of a tray and cover attachment.

FIG. 13 is a side elevational representation of a tray and cover, as shown in FIG. 11.

FIG. 14 is a side elevation showing the cover partially folded around the tray and showing the double creased hinges.

FIG. 15 shows the cover lying under a bottom of the tray.

FIG. 16 shows the cover being closed toward the tray with the double creased hinges ready for overlying the end of the tray.

FIG. 17 shows the cover closed on the tray.

FIG. 22 is a plan view of two trays for joining to the two-panel creased cover.

FIG. 23 is a side elevational view of the trays and cover shown in FIG. 22.

FIG. 24 is a side elevational assembled view of the trays and cover shown in FIGS. 22 and 23.

FIG. 25 shows the four trays ready for connecting to four flaps of a four-panel creased cover.

FIGS. 26–30 are representations of folding the cover to close the cover around the two and four trays shown in FIGS. 22–25.

FIGS. 33 and 34 show assembly of the tray on the book-style cover.

FIGS. 35 and 36 show how trays lie flat on either panel of a cover.

FIG. 37 is a schematic side elevational view showing a snap-in latch pin for connecting a cover to a tray.

FIGS. 38A and 38E are details of mounting a latch pin in the cover.

FIGS. 39 and 40 are open and closed details showing the latch pin and the receiver in the tray.

FIGS. 41 and 42 are a plan view and a detailed plan view of the tray with a latch pin receiver.

FIGS. 43 and 44 are cross-sectional side elevational views of a tray with a snap-in latch pin receiver.

FIGS. 45A, 45B and 45C are plan, elevational cross-sectional and bottom views of a tray for receiving snap-in rosettes.

FIGS. 47A, 47B and 47C are plan, elevational, cross-section and bottom views of a tray with snap-in rosettes.

FIGS. 48A, 48B and 48C are enlarged elevational cross-sectional views of a tray and rosettes showing exploded, partially assembled and fully assembled views, respectively.

FIGS. 50A and 50B show two rosettes before and after being snapped together with a tray interposed.

FIGS. 53A, 53B and 53C are plan elevational, cross-sectional and bottom views of a tray with a twist-lock rosette inserted.

FIGS. 54A and 54B are cross-sectional elevations of a tray showing a twist-lock rosette before and after insertion.

FIGS. 59A, 59B, 59C and 59D are plan, side cross-sectional, end and end cross-sectional views of a CD wall mount for mounting a CD package, such as shown in FIG. 1.

FIGS. 61A, 61B and 61C are cross-sectional side elevations of a CD box in a wall mount and being removed from a wall mount, respectively.

DETAILED DESCRIPTION OF THE PREFERRED EMBODIMENTS

Figure 1A:
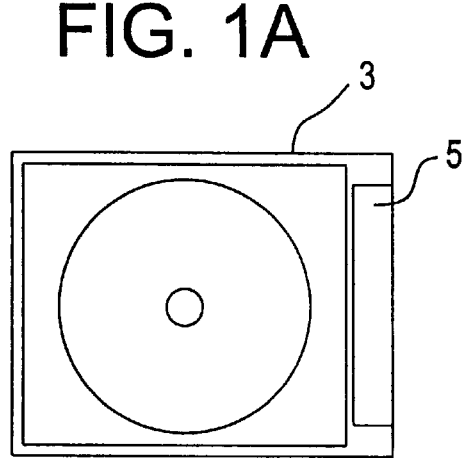
FIGS. 1A and 1B are plan and side elevations of a plastic tray.
Figure 1B:
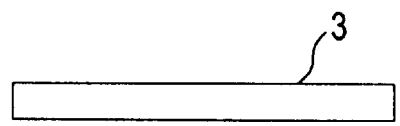
Figure 1C:
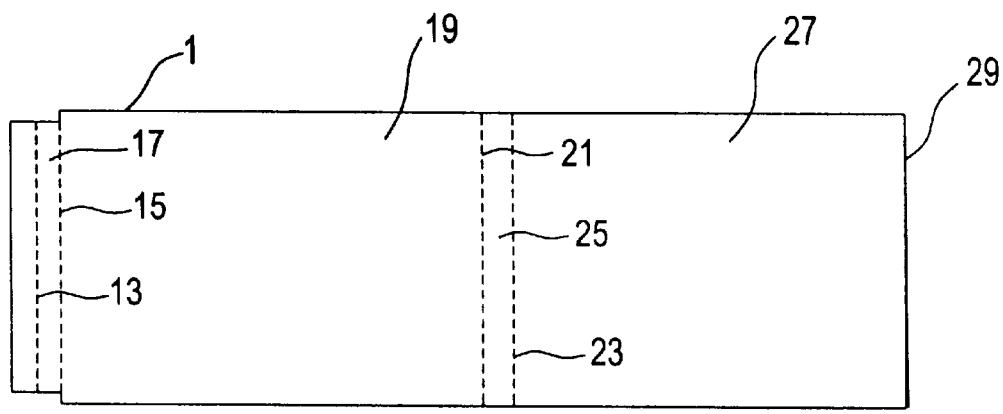
FIGS. 1C and 1D are plan and side elevations of the creased cover with a folded flap for connecting to the tray.
Figure 1D:
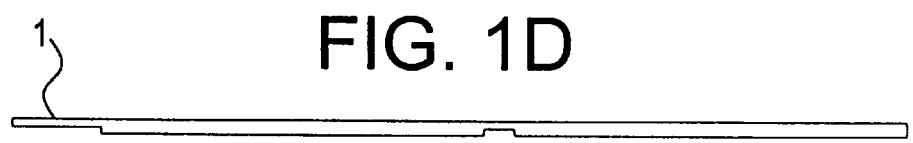
Figure 2A:
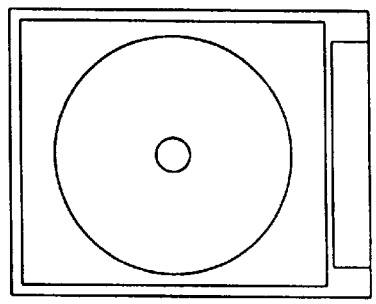
FIGS. 2A–D are plan and side elevations of the creased cover with a folded hook ready for insertion in the tray.
Figure 2B:
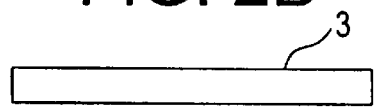
Figure 2C:
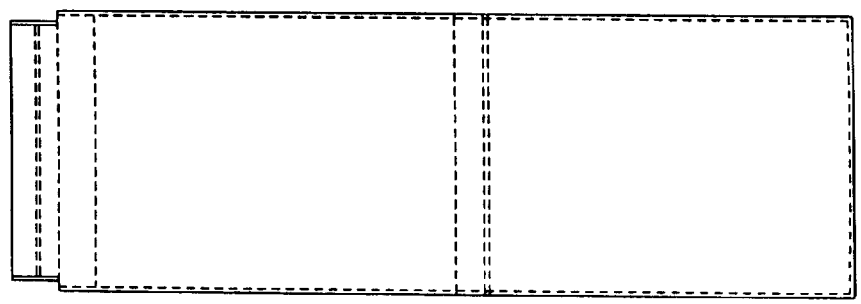
Figure 2D:

A one-piece push-in cover 1 and a plastic tray 3 with a receiver 5 are shown in FIGS. 1A–1D. The cover 1 has an attachment flap 7 which is shown in FIGS. 1A–1D in its prefolded condition.

A shown in FIGS. 2A–2D, flap 7 has been folded into a hook 9 for insertion in the receiver 5 of the tray 3.

Figure 3A:
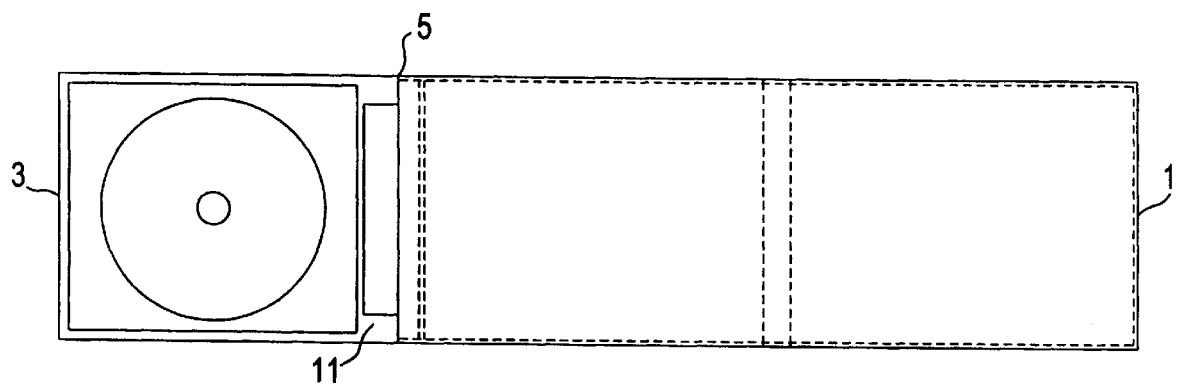
FIGS. 3A and 3B are plan and side elevations of the folded cover and tray interconnected.
Figure 3B:
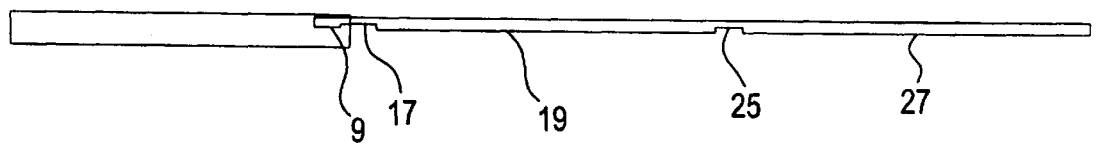

FIGS. 3A and 3B show how, with a single push, the cover panel 1 is permanently connected with the tray 3 by capturing the hook 9 under the tabs 11 of the receiver 5.

As shown in FIGS. 1A–3B, parallel folds 13 and 15 form a spine 17 at one end of the bottom panel 19. Panel folds 21 and 23 form a spine 25 at one end of the top panel 27. An edge 29 of the top panel 27 overlies the receiver 5 of the tray 3.

Figure 4A:
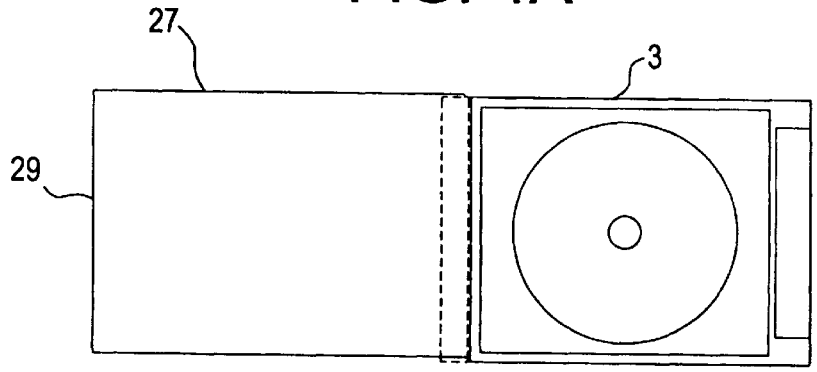
FIGS. 4A and 4B are plan and side elevations of the cover folded under the tray.
Figure 4B:
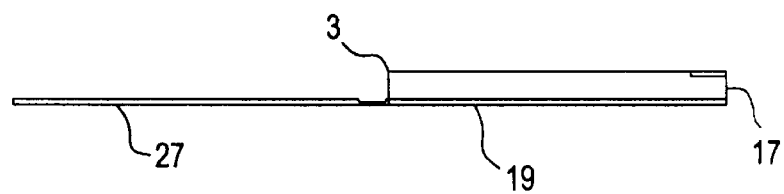

FIGS. 4A and 4B show the cover face panel 19 under the tray with the spine 17 at the end of the tray.

Figure 5A:
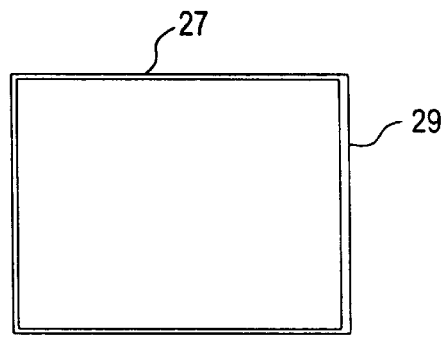
FIGS. 5A and 5B are plan and side elevations of the cover folded completely around the tray.
Figure 5B:
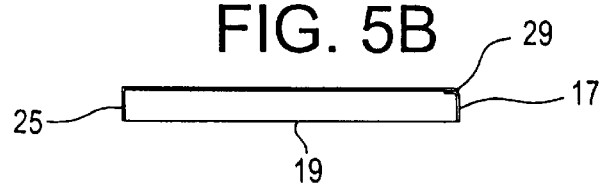

FIGS. 5A and 5B show the top panel 27 wrapped over the top of the tray with the edge 29 overlying the spine 17 so that the cover is wrapped entirely around the panel.

Figure 6A:
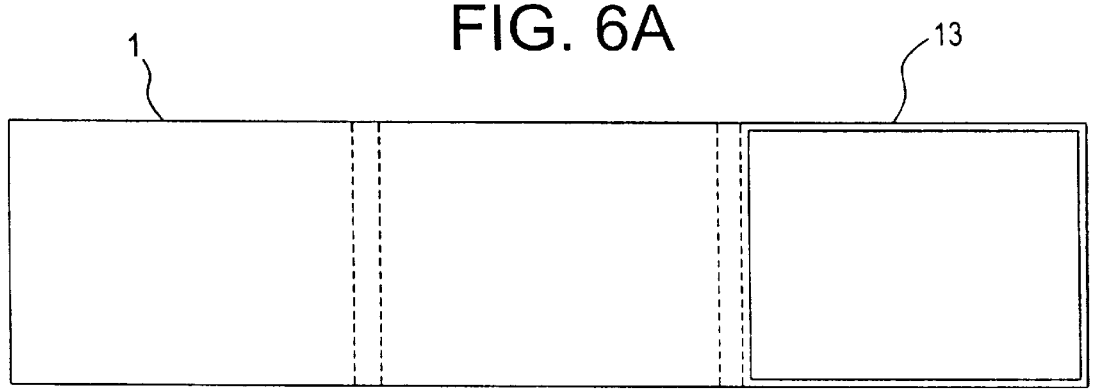
FIGS. 6A and 6B are bottom and inverted side elevations showing the tray and cover wrap opening flat.
Figure 6B:
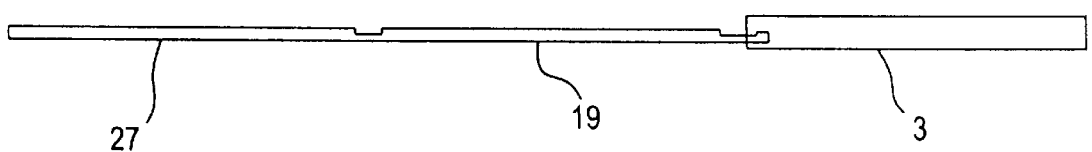

FIGS. 6A and 6B show how the assembled CD package lies flat when the tray 3 is turned upside down. That makes both sides of the cover, and in fact the entire cover, available for printing and decorative graphics. Preferably the cover 1 is paper board, which is folded and glued for stiffness. The new single push snap-in attachment allows quick and easy machine assembly of the cover and tray and provides total graphic utilization of the cover.

Figure 7A:
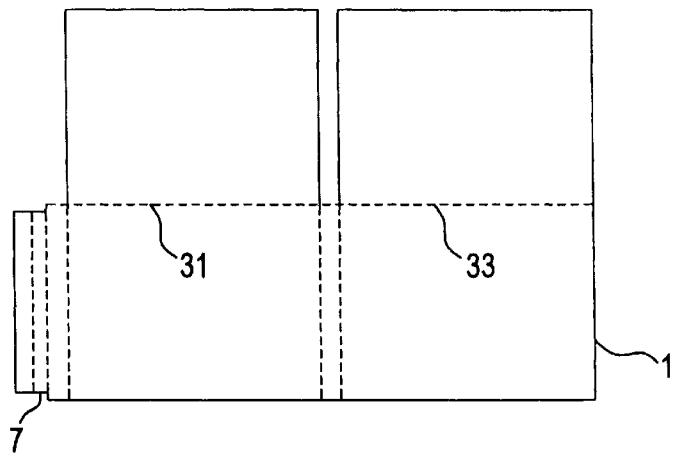
FIGS. 7A, 7B and 7C show alternative blanks for printing, folding and gluing four panels to form the cover.
Figure 7B:
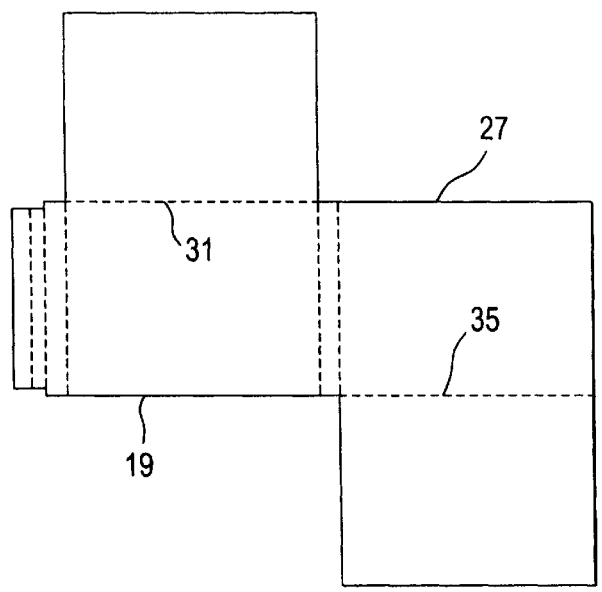
Figure 7C:
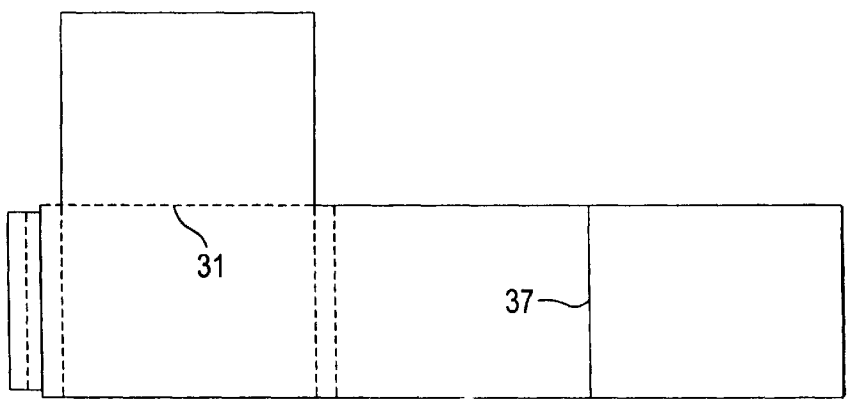
Figure 8A:
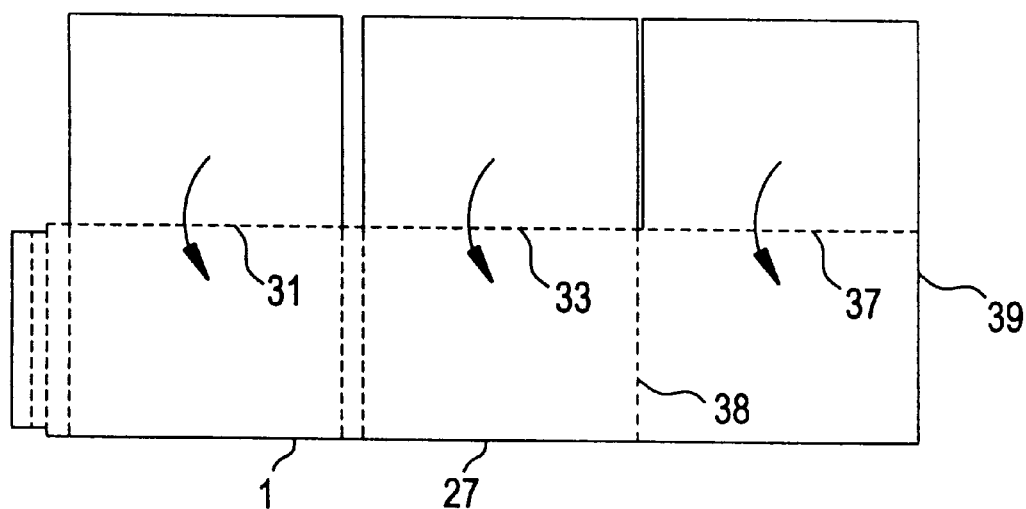
FIGS. 8A, 8B, 8C and 8D show six panel blanks for forming a cover with a fold-out top.
Figure 8B:
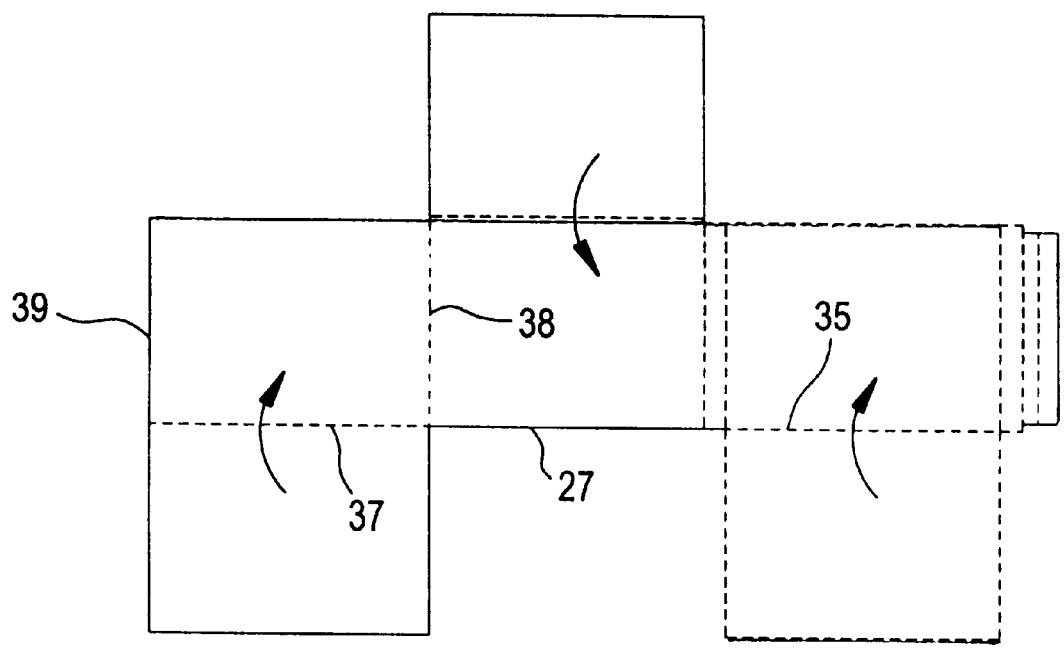
Figure 8C:
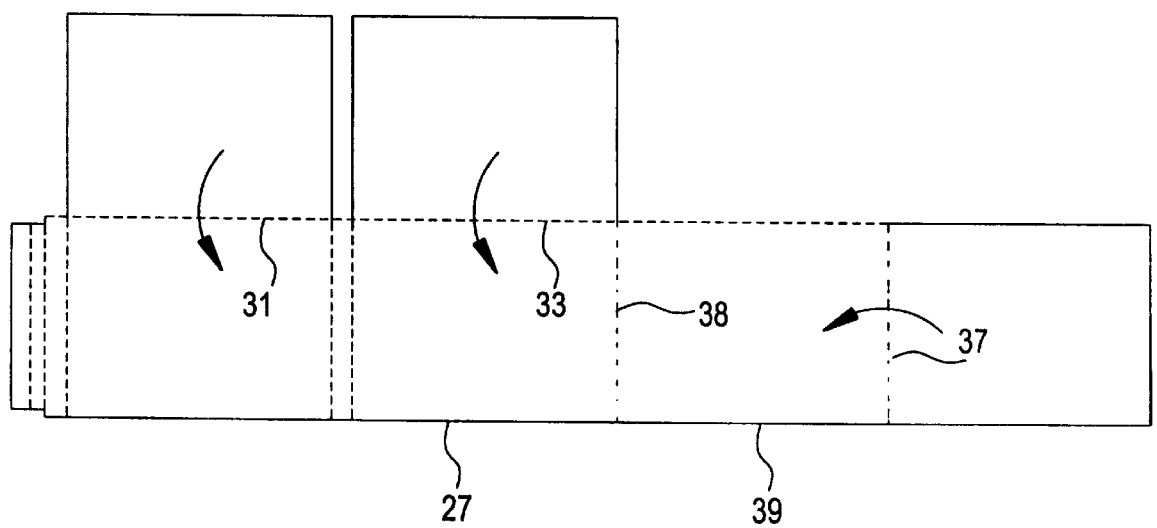
Figure 8D:
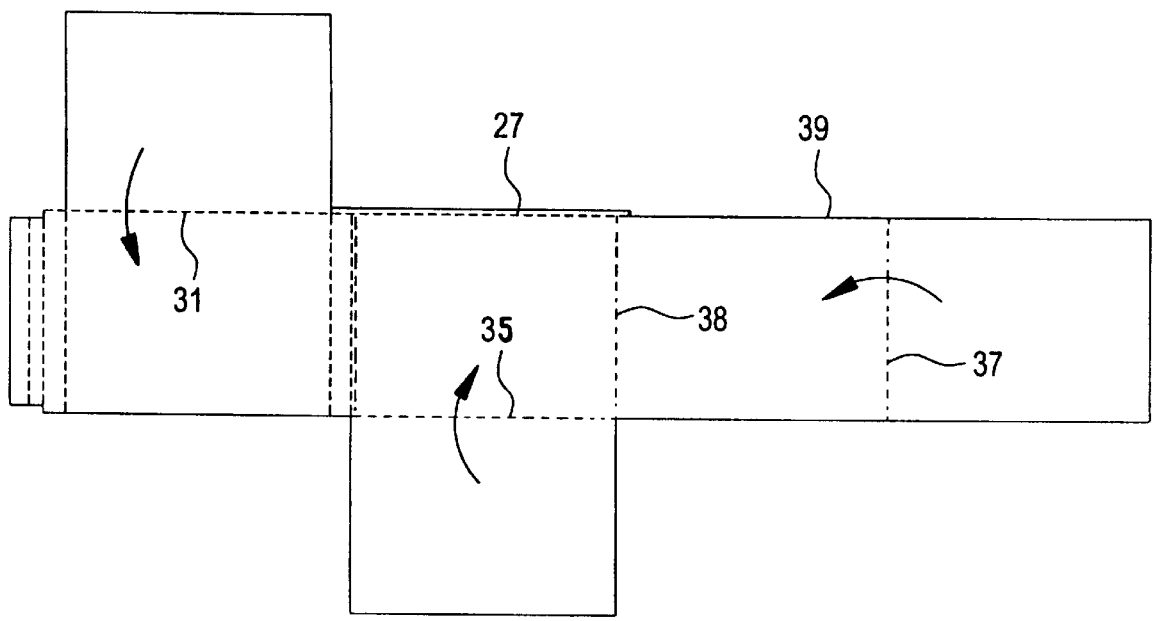

FIGS. 7A–7C show four-panel wrap-around style construction alternatives for the cover 1.

The blanks may be cut and folded along lines 31, 33, 35 and 37, and the inward-folded panels may be glued to the panels 19 and 27 to provide paper board rigidity, or the outer panels may be hinged around the folds 31–37 and allowed to fold outward to provide further graphic areas.

FIGS. 8A–8D show six-panel wrap-around style construction alternatives for the paper board cover 1 in which the outer panel may be folded around crease 38 to form a second fold-out part 39 on the top panel 27.

FIGS. 9A–12B show an alternate form of attachment between a cover 41 and a tray 43. The tray has an end 45 from which a flap 47 extends. The flap is attached to the end 45 with a living hinge 49.

The spine area 51 of the cover 41 is left with two unglued flaps. A crease 15 separates the bottom panel 19 from the spine 51.

As shown in FIGS. 10 and 11, the cover 41 and the tray 43 are joined with a single direction juxtaposition.

FIG. 12A is a detail of the preferred embodiment which is shown in FIGS. 9–11, in which the flap 47 is joined by a living hinge 49 to the end 45 of tray 43. The cover 41 has the end spine 51 formed with upper and lower layers 53 and 55, which are glued or physically connected to the flap 47.

FIG. 12B shows a modification of the invention in which the flap 47 has an inner section 57 joined at right angles, which is in turn joined to the living hinge 49 so that the inner section 57 overlies the end of the tray and forms the spine when the cover 41 is folded around the tray on living hinge 49.

FIGS. 13–17 show sequential steps in forming the covers shown in FIGS. 9, 10 and 11 in which the spine areas 51 and 25 overlie ends of the tray 43.

FIGS. 18–21 show details of the preferred form of the invention, which is also shown in FIGS. 1A–6B.

Figure 19:
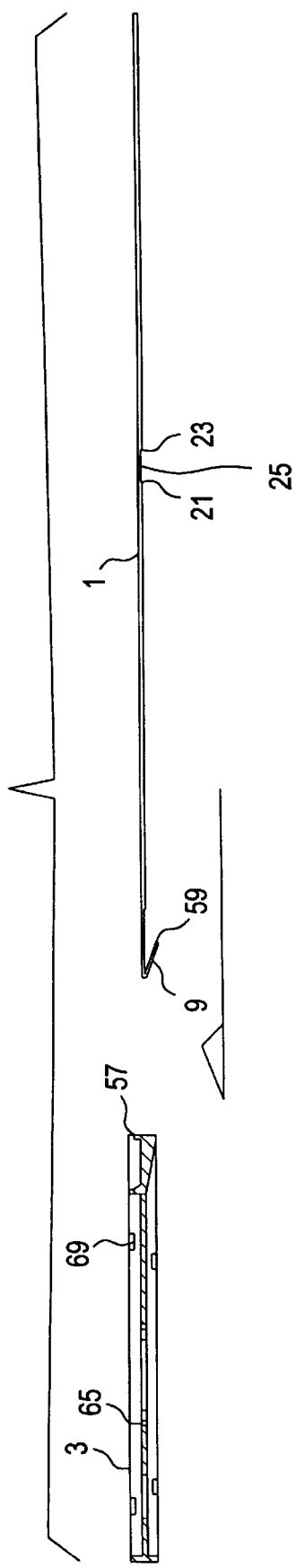
FIG. 19 is a side elevation of the elements shown in FIG. 18.
Figure 20:
FIG. 20 shows an assembled side elevation of the elements shown in FIGS. 13 and 14.
Figure 21:
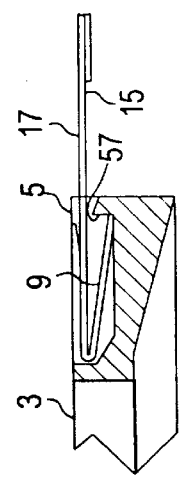
FIG. 21 is a side elevational detail of the assembled elements shown in FIG. 20.
Figure 31:
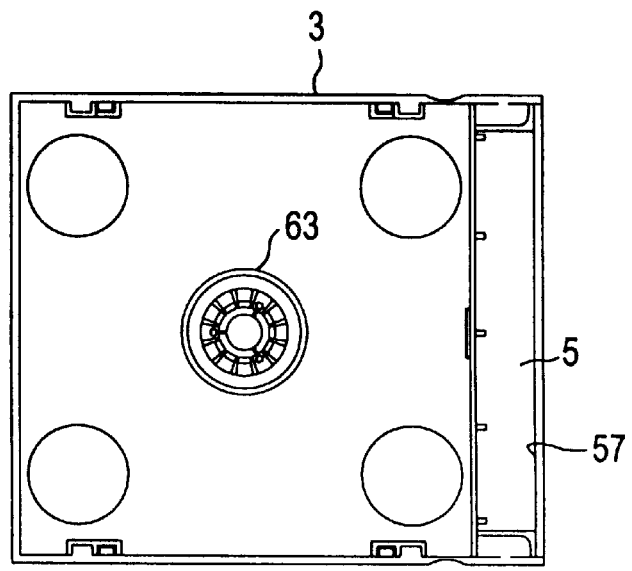
FIG. 31 is a plan view of a tray for attaching a book-style cover.
Figure 32:
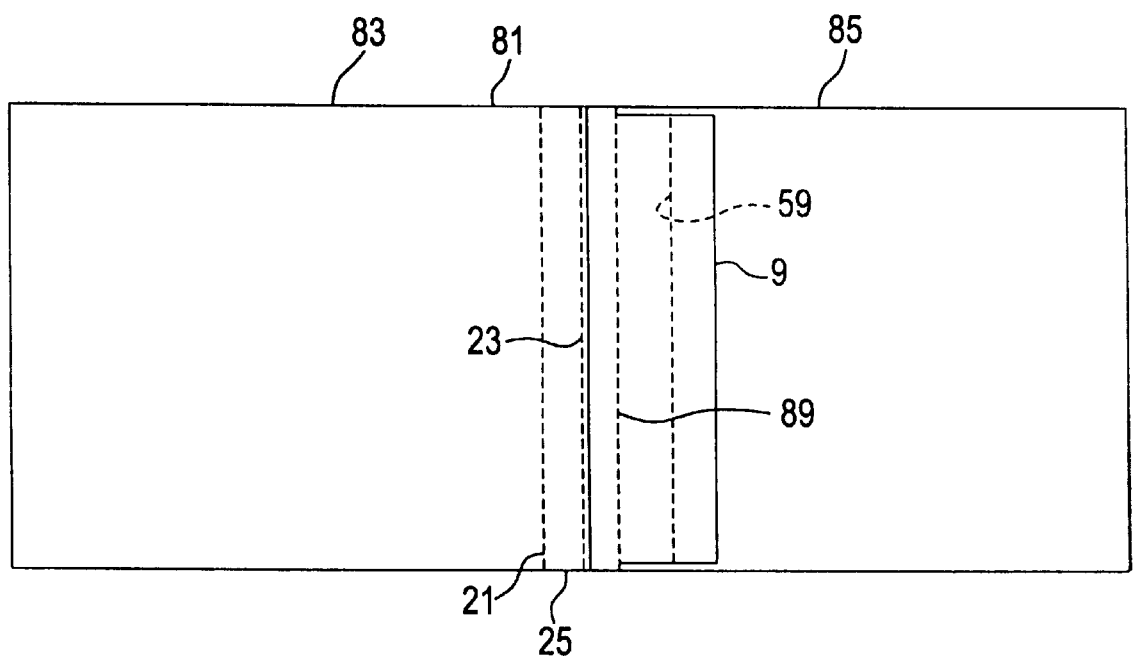
FIG. 32 is a plan view of a folded and hinged book-style cover with a central flap.

As shown in FIG. 21, an internal ledge 57 captures the end 59 of hook 9 when the cover 1 is inserted in the tray 3 by assembly in a single direction 60, as shown in FIG. 19.

The hook 9 is inserted in the receiver 5 of the tray 3 under the end tabs 11. The ledge 57 engages the edge 59 of the hook 9. Any outward pulling on cover 1 is resisted by the edge 59 ledge 57 interengagement which occurs in the plane of the cover 1 and tray 3.

The tabs 11 are formed at the ends of the receiver 5 through the openings 61 so that the entire tray may be formed in a mold cavity without shutoffs or side actions.

Figure 18:
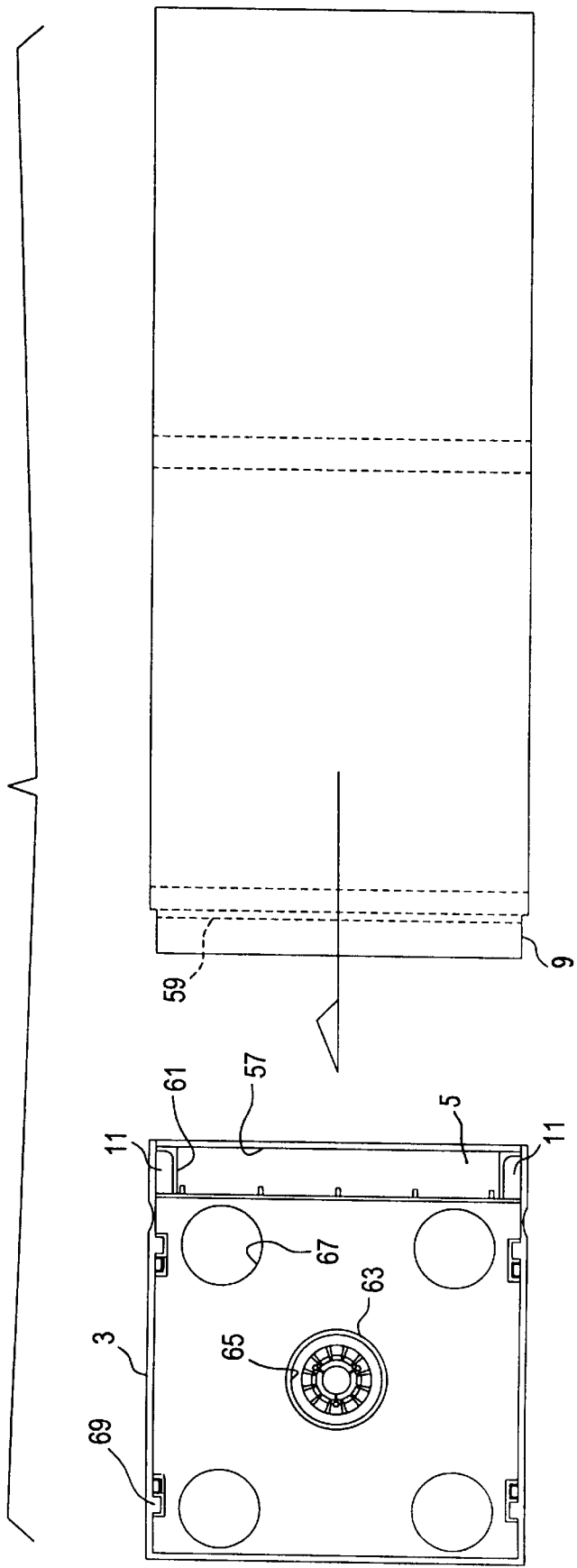
FIG. 18 is a plan view of a tray and a hinged cardboard cover for connecting to the tray.

FIG. 18 shows a rosette 63 mounted in the central opening 65 in the tray. Finger openings 67 allow the easy removal of the compact disc held on the rosette 63. Ledges 69 which inwardly extend from outer walls of the tray support edges of the cover.

FIGS. 22–24 show the joining of two trays to a single cover 71 with hooks 9 on opposite ends. Alternatively, the multiple trays and cover may be joined as shown in FIGS. 9–12B.

The covers are joined to the trays with single planar inward movements of the trays, as shown by the arrow 60. The central spine 25 has a width double the width of the trays so that the two trays are accommodated. Single thickness spines 17 are formed at each end of the tray. The identical panels 73 and 75 form a top and bottom of the package with the trays folded inward and overlying each other.

The trays 3 hold one or two compact discs. In the latter case the compact discs are held on opposite sides of the trays.

FIG. 25 shows an embodiment in which four identical trays are joined to a single cover 77. The trays may be single or double sided for holding from four to eight discs in the package which employs the cover 77. The cover 77 has four separate hooks 9 for joining to the receivers 5 in the trays 3. In all other aspects the cover 77 is similar to the cover 71 shown in FIGS. 22–24.

FIGS. 26–30 show sequential steps of folding the trays and covers 71 or 77.

As shown in FIGS. 31–36, one embodiment of the single hinge tray and cover connection, such as the push-in snap-in paper board cover and tray assembly is a book-style attachment. The cover 81 has two panels 83 and 85. A flap 87 extends from the center. The flap has a crease 89 on which a hook 9 with its engaging edge 59 are formed.

As shown in FIG. 33, the tray 3 is assembled on the hook 9 with a single unidirectional motion 60. A spine 88 is formed between the crease 89 and panel 85 so that the tray 3 may lie flat in either direction, as shown in FIGS. 35 and 36.

The cover flap may be joined to a flap hinged on the tray, as shown in FIGS. 9–12B.

FIGS. 37–44 show details of complementary fasteners for holding the cover top 27 closed on the tray 3.

As shown in FIGS. 38A and 38B, the two-layer top panel 27 has outer and inner holes 90 and 91. A snap fastener 93 is pressed into the holes. The snap fastener has a top 95 which rests on a ledge 96 in hole 90, and has a throat 97 which extends through the hole 91. Knobs 98, which may be a circular bead, bear against the inside of the panel 27 and prevent the snap 93 from being removed from the panel. Split extensions 99 engage the opening 100 in a flat end 101 of the tray 3. Walls 103 of the opening are sloped to guide the extension 99 into the opening 100 for creating a press or snap fit, as shown in FIG. 40.

Lifting the edge 29 of the top 27 pulls the extensions 99 out of the opening, releasing the top panel 27 from connection to the tray.

The top panel snap fastener may be an elongated rectangular snap for engaging a transverse tray ridge spaced inward from the end of the tray.

As shown in the enlarged details of FIGS. 39 and 40, the tabs 11 have sloped surfaces 105 and the ledges 57 have sloped surfaces 107, which aid in the insertion of the hook in the receiver 5. Sloped reinforcements 109 reinforce the end of the tray 3 while not obstructing the hook.

FIGS. 41 and 42 are plan views and FIGS. 43 and 44 are elevational cross-sections showing details of the closure receiving hole 100 in the end of the tray.

The preferred trays have a shelf 111 which extends between the tabs 11 and which includes the opening 100. The shelf holds down the point of the hook on the cover flap. The central portion 113 of the shelf 111 is extended to strengthen the hole 100 and the sloped wall 103 leading to the hole.

As shown in FIGS. 41 and 42, the area around the extension 113 is tapered 115. A sloping wall 117 leads upward from the base 119 to the shelf 111.

As shown in FIGS. 39–44, the tray is single sided and has a single rosette 63, which will be described in greater detail.

FIGS. 45A–58B show rosettes for mounting in trays 3.

The double-sided trays have a central opening 65 for receiving the rosettes. As shown in FIGS. 45A–45C, a tray 3 has a central opening 65 for receiving a snap-in rosette. Recesses 121 in the top and 123 in the bottom of the tray base 125 surround the opening 65.

Figure 46B:
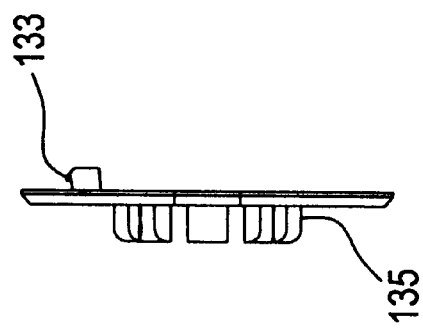
FIGS. 46A, 46B and 46C are plan side elevational cross-sectional and side elevation views of a snap-in rosette.
Figure 46A:
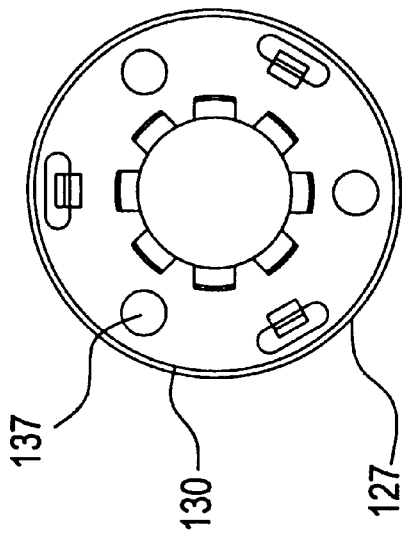
Figure 46C:
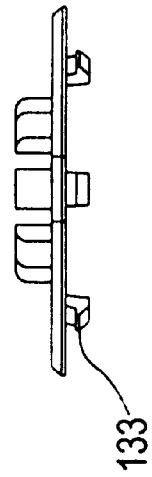
Figure 49C:
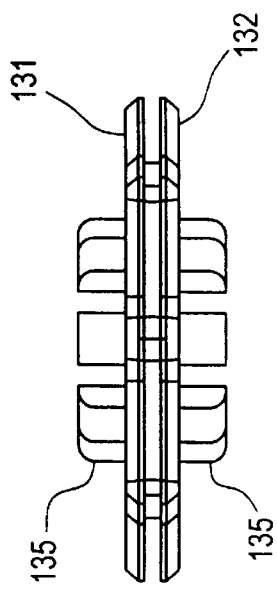
FIGS. 49A–49D show plan and side views of a rosette for snapping to a second rosette.
Figure 49D:
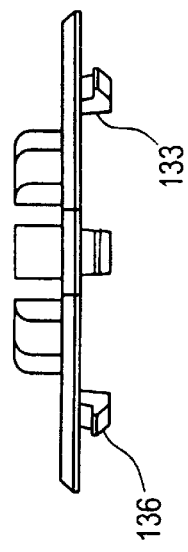
Figure 49A:
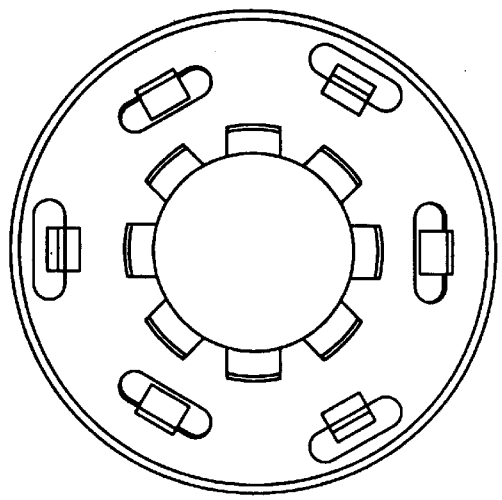
Figure 49B:
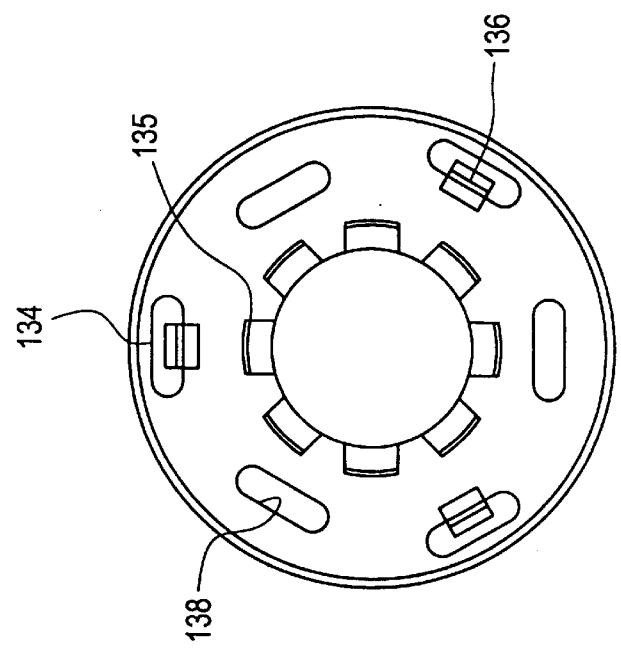
Figure 51C:
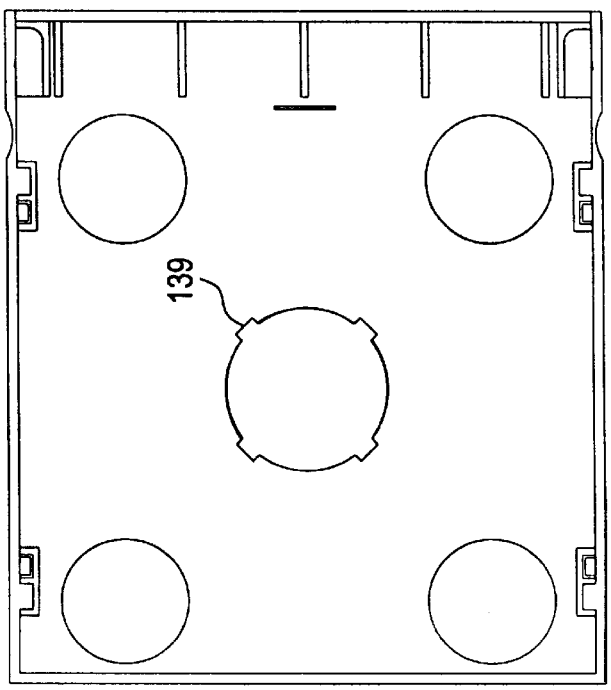
FIGS. 51A, 51B and 51C are plan, cross-sectional elevation and bottom views of a tray for receiving a twist-lock rosette.
Figure 52:
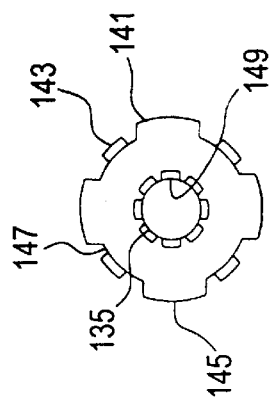
FIG. 52 is a plan view of a twist-lock rosette.
Figure 51A:
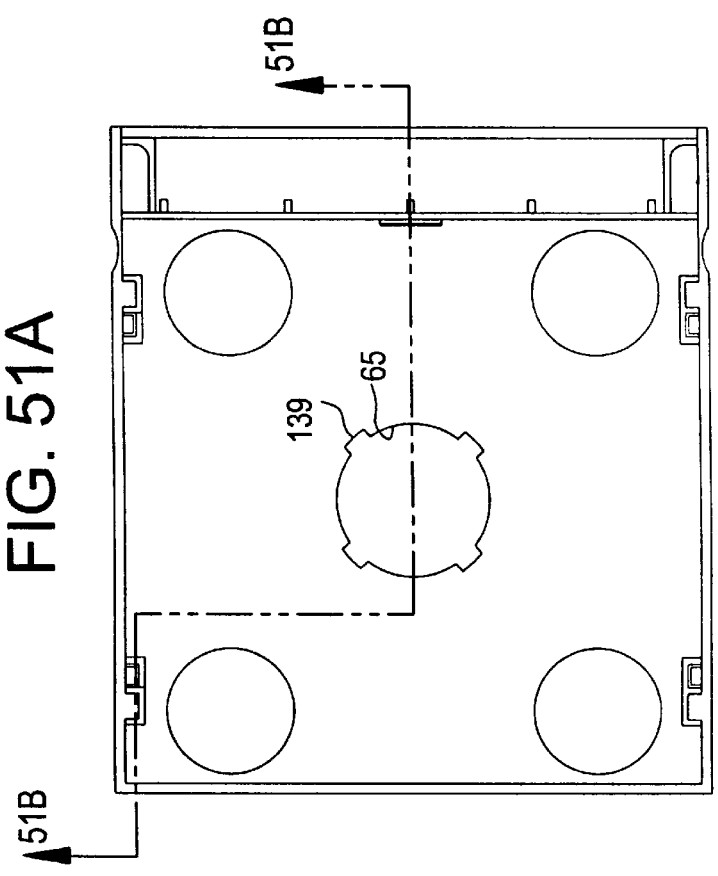
Figure 51B:
Figure 55A:
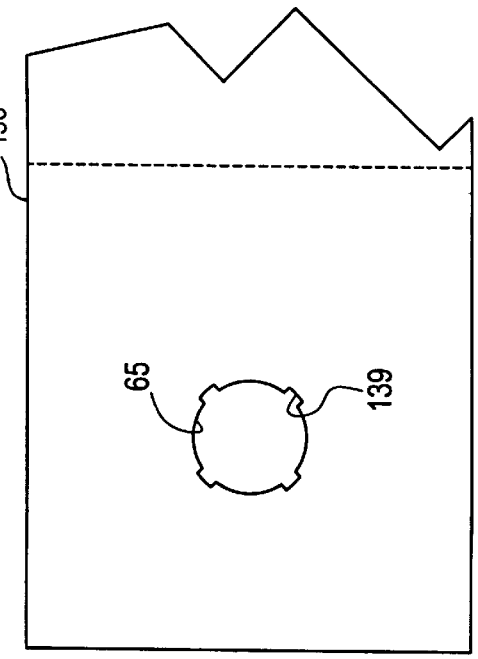
FIGS. 55A and 55B show paper board trays for receiving a twist-lock rosette.
Figure 55B:
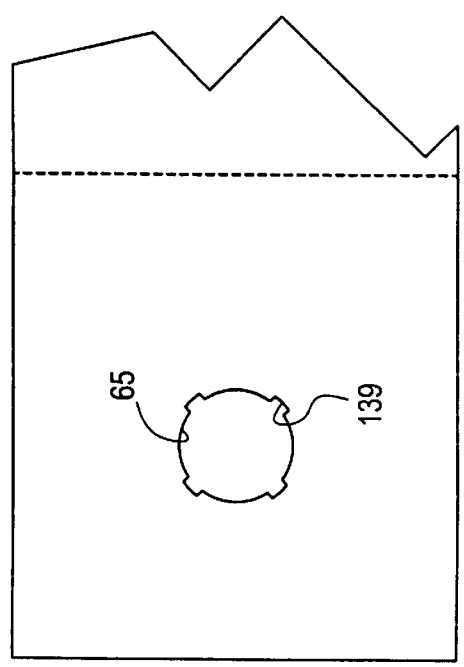
Figure 56A:
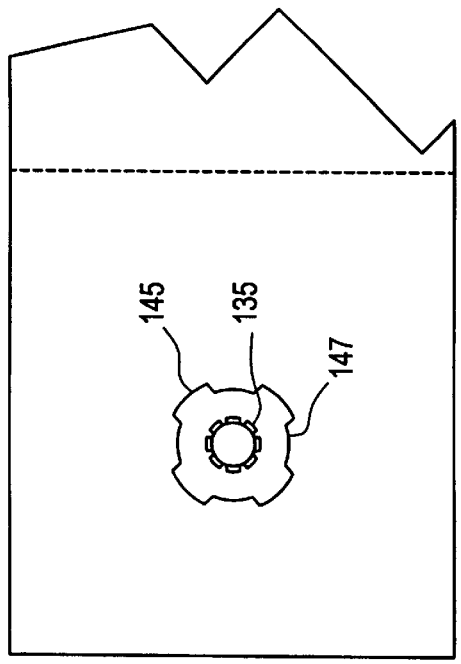
FIGS. 56A and 56B are plan and bottom views of the paper board tray with a twist-lock rosette inserted.
Figure 56B:
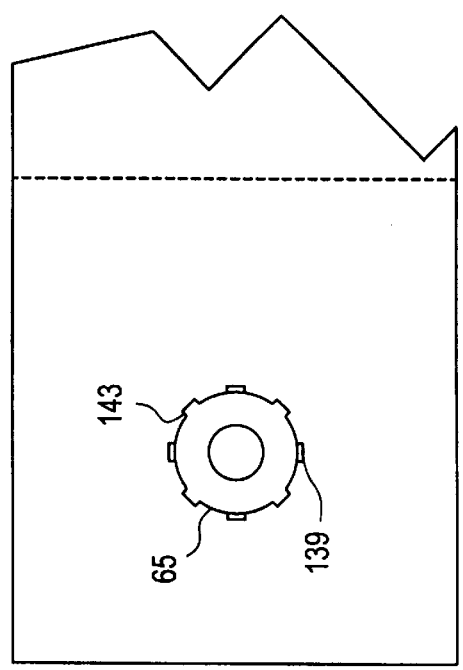
Figure 57A:
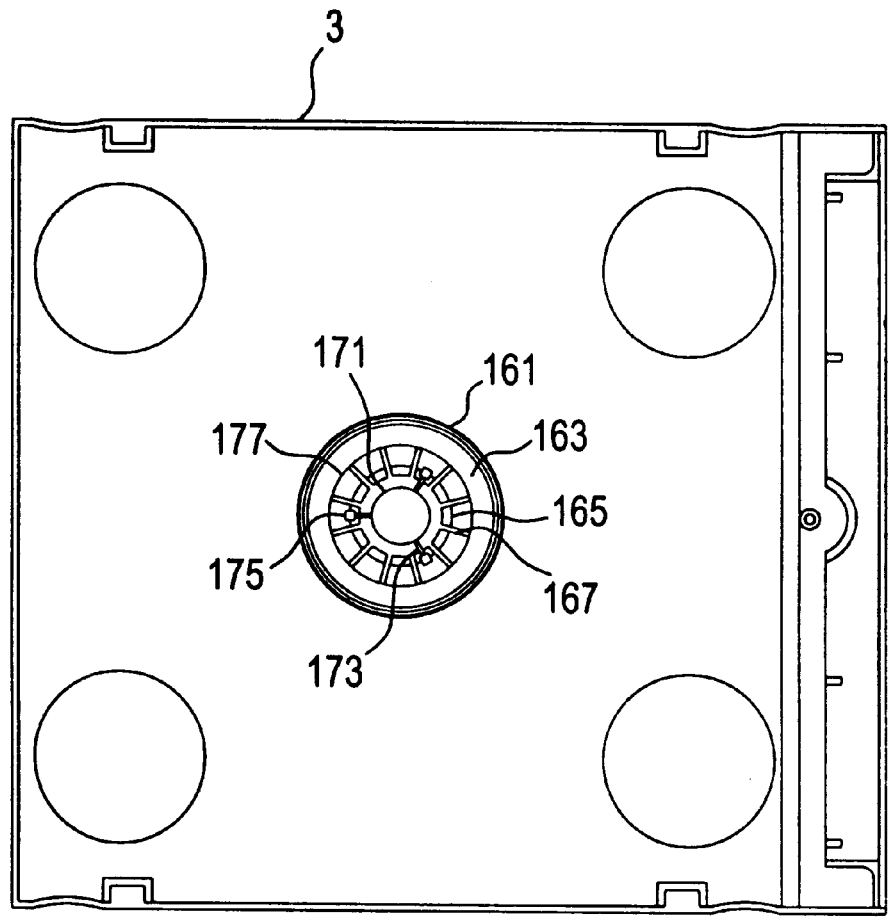
FIGS. 57A and 57B are plan and cross-sectional elevation views of a molded tray and locking rosette, showing a push release button.
Figure 57B:
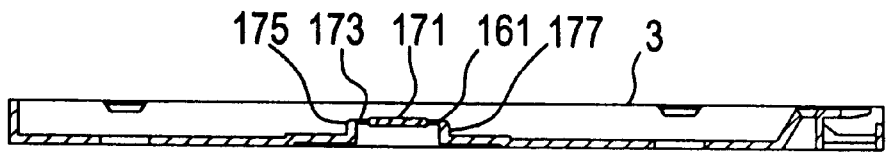
Figure 58A:
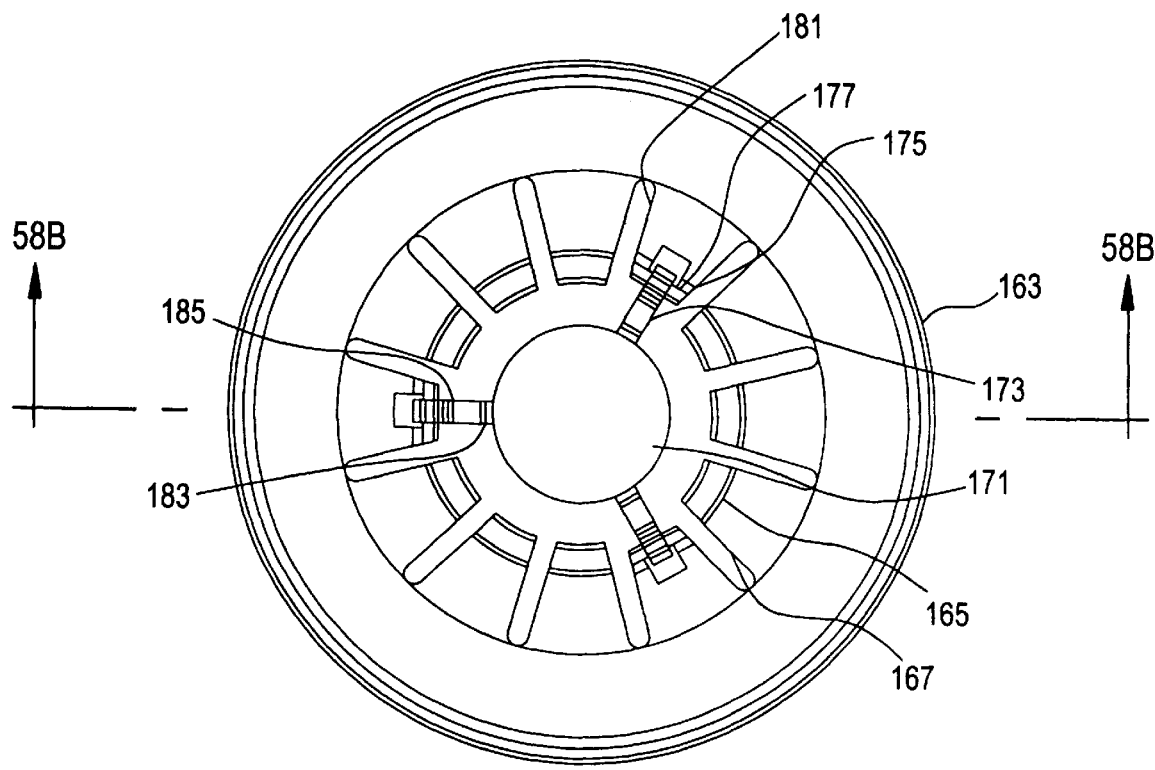
FIGS. 58A and 58B are plan and cross-sectional elevational details of the push release rosette shown in FIGS. 57A and 57B.
Figure 58B:
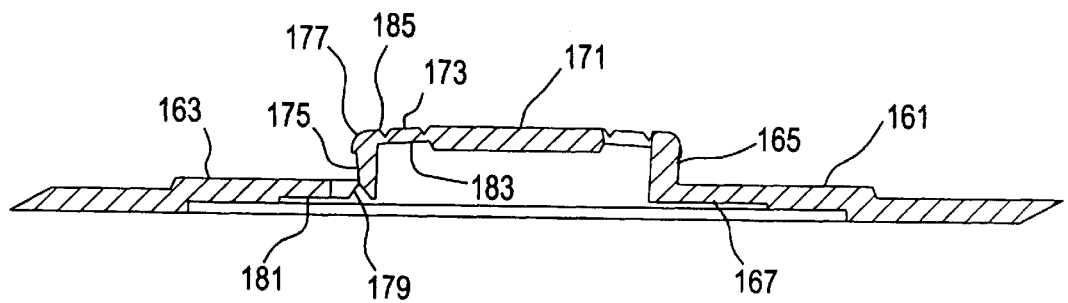

The recesses 121 and 123 receive the bases 127 of the snap-in rosettes 131 shown in FIGS. 46A–46C and prevent lateral movement of the rosettes after the prongs 133 are snapped through the holes 65. The CD disc retainer petals 135 are molded on the opposite side of the base 127. Holes 137 through the base 127 permit prongs from a second disc retainer rosette to be snapped through the opening 65 when the holes 137 are aligned with the prongs 133 from the opposite disc, as shown in FIG. 47B. FIGS. 47A–47C show the snap-in rosettes in place.

FIGS. 48A–C are enlarged views of the tray 3 during assembly steps with the rosettes 131.

As shown in FIG. 48B, one rosette 131 is first snapped through the opening 65, locating the periphery of the rosette base 127 in the recess 121, and engaging the bottom of the hole 65 with radially extending teeth on the snap prongs 133. In this example there are three prongs. Rotating the opposite rosette 132 60° with respect to the upper rosette 131 allows the snap-in prongs 133 to project into the openings 137, as shown in FIG. 48C.

FIGS. 49A–D show a rosette 132 with openings 134. Teeth 136 of the mounting prongs 133 are aligned with three of the openings 134. The openings 138 are positioned slightly inward of openings 134. The prongs of the opposing rosette fit in the openings 138 and the teeth engage the edge of the openings 138.

As shown in FIGS. 50A and 50B, the central opening in the tray base 125 may be slightly enlarged to freely pass the rosette mounting prongs 133 and their teeth 136. The prongs and teeth snap into openings in the opposing rosettes, locking the rosettes on the tray base. Two rosettes snap to each other capturing a plastic tray or cardboard carrier.

FIGS. 51A–56B show twist-lock rosettes. The rosette-receiving hole 65 in the tray 3 shown in FIGS. 51A–51C has radial extensions 139 for receiving the twist-lock rosettes 141. Prongs 143 fit within the radial openings 139 and the extensions 145 of the curved rosette bases 147 cover the openings 139 when the rosettes are turned ⅛th of a rotation. The assembled structure is shown in FIGS. 53A–53C. The retainers 135 are formed around the central opening 149 of the rosette.

FIGS. 54A and 54B are enlarged assembly views of the tray 3 and the twist-in rosette 141.

FIGS. 55A–56B show the assembly of a twist-lock rosette 141 in a cardboard substrate 150, which is used instead of a tray 3.

The twist-lock rosettes may be used for double-sided holding of compact discs, slightly elevating the extensions 145 or by twisting the rosettes slightly less or more than 45° so that twist-in prongs 143 from a bottom rosette may be inserted through the radial extensions 139 of the opening 65.

Compact disc packages may be subjected to rough handling during shipping. As shown in FIGS. 57A–58B, to ensure against dislodgement of the rosette during rough handling, a locking rosette 161 is provided. The locking rosette has an integral base 163 and rosette petals 165, which are mounted on cantilevered spring bases 167. A central button 171 has connectors 173 to individual locking petals 175 with extended teeth 177.

The locking petals 175 are hinged 179 to inward extending arms 181 on the base. The connectors 173 have thin joints 183 and 185. The central button 171 is pressed downward to intentionally release a CD. The connectors 173 flex at thin portions 183 and 185, pulling petals 175 inward around hinges 179 and disengaging the teeth 177 from locking contact with the central opening in the CD. Once pushed downward, the button 171 remains downward so that the CD is not relocked. The hinge 179 and the thin portions 183 and 185 of connector 173 provide the additional advantage that the plastic material whitens upon being flexed, which is an immediate indication of tampering with the CD.

Because CD packages are small, locating CD packages in a library or CD file may be difficult.

A great deal of attention and effort is spent on making CD packaging bright and attractive.

The present invention as shown in FIGS. 59A–61C shows a CD wall mount to take advantage of the attractive designs on the packaging to make the compact disc packages visually accessible.

The wall mount 200 has a rectangular open base 201 with holes 203 for mounting screws. Walls 205 extend around the base perpendicular to the frame. Supports 207 extend slightly upward from the base to support a CD package and prevent its contact with the base. L-shaped supports 209 with rounded seats 211 and thin outward extensions 213 hold the CD package away from the base 201 and away from the side walls 205. The L-shaped supports 209 are spaced inward from the ends 213 and 215 of the base.

Figure 60B:
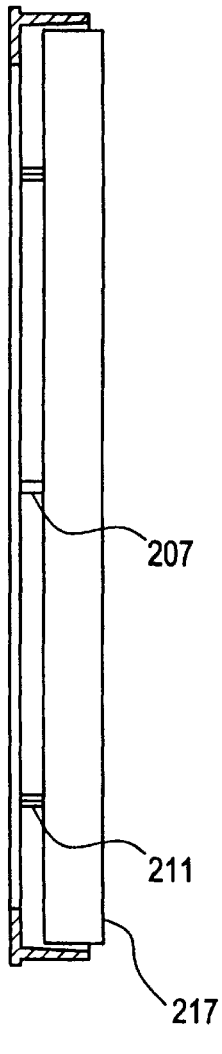
FIGS. 60A, 60B add 60C are elevational, side cross-sectional and bottom cross-sectional views of a CD package wall mount showing a CD package held in the wall mount.
Figure 60A:
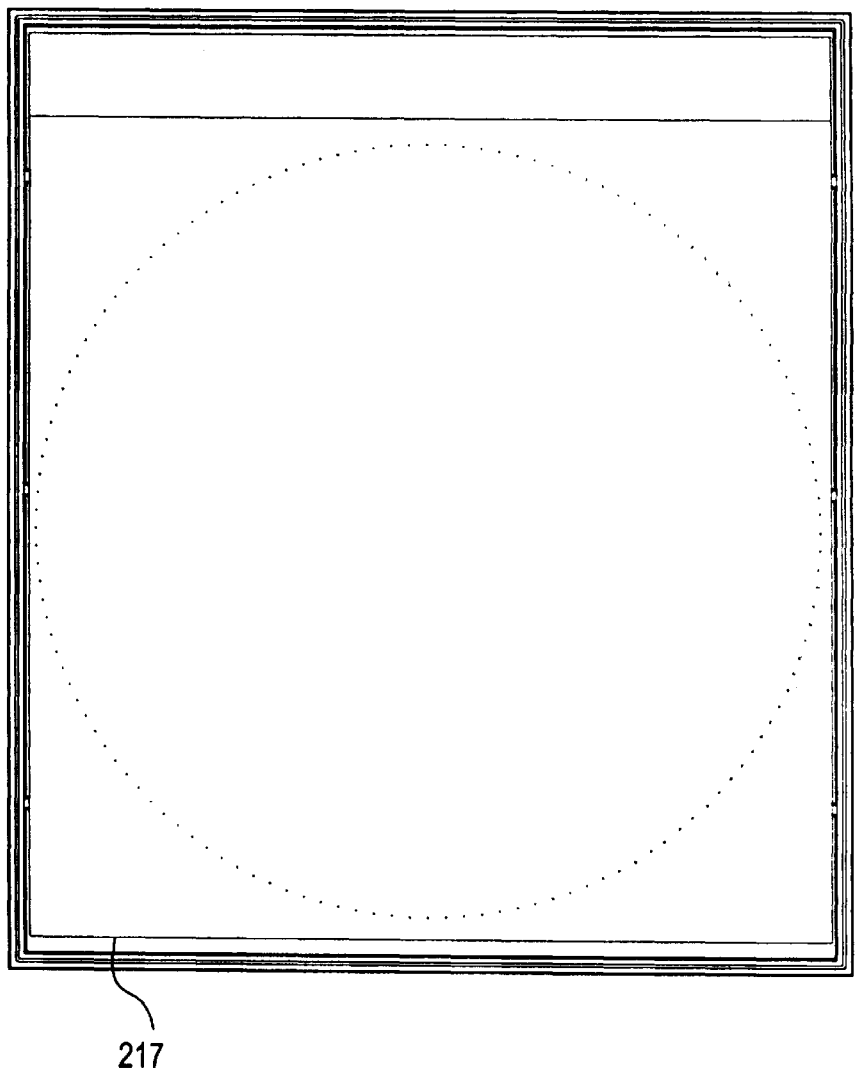
Figure 60C:
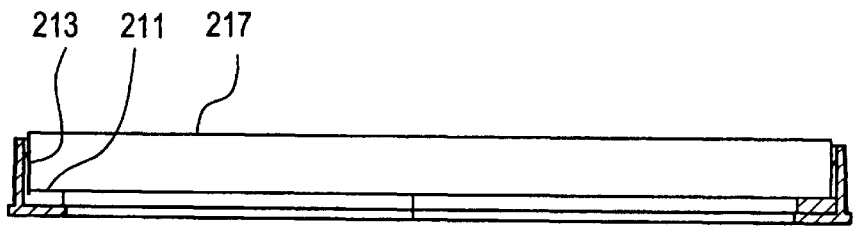

As shown in FIGS. 60A–60C, the compact disc package 217 rests upon supports 207 and 211 and is held inward from the sides 205 by the spacers 213. When one wishes to remove the container 217 from the wall mount 200, a simple push in a normal direction 216 near one end causes the other end of the CD package to move outward, as shown by the arrow 218. The pushing may be done at either end. The thin elements 213 at the sides of the CD package insure gripping of the CD in a press fit while permitting release and outward movement of the CD package upon the intentional pressing 216 near one end. To return the CD package, it is simply pressed back into the frame. The tapered ends 219 on the gripper elements 213 provide easy alignment and insertion of the CD package.

While the invention has been described with reference to specific embodiments, modifications and variations of the invention may be constructed without departing from the scope of the invention, which is defined in the following claims.

"While this invention has been described with reference to receiving and packaging compact discs, it can also be used for receiving other types of media including, but not limited to, optical, magnetic, electronic and printed media, as well as other objects."

We claim:

1. A disc package apparatus comprising a plastic tray having a base with a rosette for engaging a central hole of a disc and having at one end of the tray an outward opening receiver with a ledge along the opening, a folded and creased paper board cover having a bottom panel and a top panel and an outer spine panel defined by creases between the bottom panel and the top panel, an end spine panel connected to the bottom panel and a folded hook extending outward from the end spine panel, the folded hook having a dimension for fitting through the opening in the receiver of the tray for assembling the cover on a tray with one single unidirectional motion, and the hook having an edge for lying inside the receiver and against the ledge for preventing disengagement of the cover from the receiver, for providing a package with complete accessibility of all sides of the paper board cover for printing and for providing a package which lies flat when the cover is partially or fully open, wherein the receiver further comprises a flat intermediate surface extending across one end of the tray, wherein the opening is in the end of the tray above the flat intermediate surface, and wherein the ledge extends upward from the flat intermediate surface at the end of the tray, partially closing the opening, and further comprising tabs positioned above a level of the intermediate surface and extending generally parallel to the surface for holding the hook downward on the surface with the edge of the hook engaging the ledge.

2. The apparatus of claim 1, wherein the intermediate surface terminates laterally inward from the tabs so that the receiver and the tray may be made in a mold without side actions.

3. The apparatus of claim 1, wherein the base of the tray extends along a middle of the tray, and further comprising side walls and an end wall opposite the receiver extending perpendicularly to the base above and below the base, and further comprising cover supports extending inward from edges of the side walls for supporting the cover.

4. A disc package apparatus comprising a plastic tray for holding a disc and a cover attached to the tray and a latch pin mounted in the cover remote from edges of the cover, the tray having an upward expanding opening at an upper portion thereof for receiving and guiding a latch pin and gripping the latch pin to hold the cover closed with the tray.

5. The apparatus of claim 4, wherein the cover comprises a paper board cover, and having a hole therein remote from edges of the cover and a latch pin inserted in the hole, the latch pin having a flat top for positioning in the hole and having a throat for extending through the hole and fastener prongs extending downward from the cover for connecting with the gripper opening in the tray.

6. The apparatus of claim 5, further comprising raised knobs extending outward from the fastener prongs adjacent the cover for snapping the knobs in through the opening in the cover and preventing return through the opening.

7. The apparatus of claim 6, wherein the cover is made of two-ply material and the upper ply has a relatively large opening for receiving the latch pin top, and wherein the lower layer has a relatively small concentric opening for receiving the latch pin throat.

8. A disc package apparatus comprising a tray having a base with a central hole for receiving a rosette for holding a disc, a rosette for connecting to the central hole, the rosette having a generally disc-shaped base and disc-engaging rosette petals extending generally perpendicularly in one direction from the base and spaced prongs extending from the rosette base generally perpendicularly in a direction opposite the rosette petals, the prongs extending through the central hole in the tray base for holding the rosette in the central hole and in the tray base, wherein the central hole in the tray base has a recessed depression around the hole, and wherein the rosette base has a periphery for fitting in the recessed depression of the tray base.

9. A disc package apparatus comprising a tray having a base with a central hole for receiving a rosette for holding a disc, a rosette for connecting to the central hole, the rosette having a generally disc-shaped base and disc-engaging rosette petals extending generally perpendicularly in one direction from the base and spaced prongs extending from the rosette base generally perpendicularly in a direction opposite the rosette petals, the prongs extending through the central hole in the tray base for holding the rosette in the central hole and in the tray base, wherein the prongs have outward extending teeth for snapping into the central hole in the tray base and holding the rosette in the central hole.

10. The apparatus of claim 9, wherein the rosette base has plural holes extending through the base, whereby a second rosette on an opposite side of the tray base may be snapped into the tray with the prongs of the rosettes extending through the holes in the opposite rosette bases and the teeth engaging the rosette holes for holding the prongs in the holes.

11. The apparatus of claim 10, wherein the holes are extended in a circular direction and have radially enlarged portions thereof for receiving the prongs and teeth and twisting the rosettes into locking position.

12. The apparatus of claim 9, wherein the prongs extend through the holes in the rosette base, and wherein the teeth engage the central hole in the tray base in snap fit arrangement.

13. The apparatus of claim 8, wherein the tray base is a flat sheet of material.

14. The apparatus of claim 13, wherein the tray base is a paper board.

* * * * *